US011735926B2

(12) United States Patent
Milivojevic et al.

(10) Patent No.: US 11,735,926 B2
(45) Date of Patent: *Aug. 22, 2023

(54) SOLAR PV AND AC SOURCE POWER BLENDING CONTROLLER

(71) Applicant: PREMIER ENERGY HOLDINGS, INC., Frederick, CO (US)

(72) Inventors: Nikola Milivojevic, Boulder, CO (US); Yusuf Gurkaynak, Arvada, CO (US); Vivek Sankaranarayanan, Boulder, CO (US)

(73) Assignee: PREMIER ENERGY HOLDINGS, INC., Frederick, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/521,289

(22) Filed: Nov. 8, 2021

(65) Prior Publication Data

US 2022/0131383 A1    Apr. 28, 2022

Related U.S. Application Data

(63) Continuation-in-part of application No. 16/634,058, filed as application No. PCT/US2018/043485 on Jul. 24, 2018, now Pat. No. 11,171,486.
(Continued)

(51) Int. Cl.
*H02J 3/38* (2006.01)
*H02J 1/10* (2006.01)
(Continued)

(52) U.S. Cl.
CPC ............. *H02J 3/381* (2013.01); *H02J 1/102* (2013.01); *H02J 3/32* (2013.01); *H02J 7/34* (2013.01); *H02J 2300/26* (2020.01)

(58) Field of Classification Search
CPC .... H02J 3/381; H02J 1/102; H02J 3/32; H02J 2300/26; H02J 7/00; H02J 7/34; H02J 7/0068; H02J 7/35; H02J 3/383
See application file for complete search history.

(56) References Cited

U.S. PATENT DOCUMENTS

| 6,222,117 B1 | 4/2001 | Shiozaki |
| 2006/0092588 A1 | 5/2006 | Realmuto et al. |

(Continued)

OTHER PUBLICATIONS

PCT/US2018/043485 International Search Report and Written Opinion dated Oct. 11, 2018, 9 pages.
(Continued)

*Primary Examiner* — Carlos Amaya
(74) *Attorney, Agent, or Firm* — Cozen O'Connor

(57) ABSTRACT

An energy blending device has a first input for alternating current, a second input for connection to a solar array, and an output, the energy blending device receiving energy from the first input, both inputs coupled to power an energy blending node. The device is in a configuration either with the solar array matching a voltage of the energy blending node, the blending node providing power through a DC-DC converter to a load interface device, and the solar array coupled through a DC-DC converter to the energy blending node, the energy blending node providing power to a load interface device. A microcontroller controls the DC-DC converter and a load interface device. The energy blending device has an energy storage system having a battery coupled either directly to the energy blending node or through a bidirectional energy storage interface to the energy blending node.

23 Claims, 17 Drawing Sheets

Related U.S. Application Data

(60) Provisional application No. 62/536,161, filed on Jul. 24, 2017.

(51) Int. Cl.
  *H02J 7/34* (2006.01)
  *H02J 3/32* (2006.01)

(56) References Cited

U.S. PATENT DOCUMENTS

| | | | |
|---|---|---|---|
| 2008/0150366 A1* | 6/2008 | Adest | H02J 3/381 |
| | | | 307/77 |
| 2012/0161525 A1 | 6/2012 | Hong et al. | |
| 2013/0264865 A1 | 10/2013 | Sugeno et al. | |
| 2014/0060100 A1 | 3/2014 | Bryson | |
| 2015/0214787 A1* | 7/2015 | Gerhardinger | H02J 1/12 |
| | | | 307/26 |
| 2016/0241039 A1 | 8/2016 | Cheng et al. | |
| 2017/0133852 A1 | 5/2017 | Macdonald | |

OTHER PUBLICATIONS

PCT/US2018/043485 Response to Written Opinion filed May 22, 2019, 14 pages.
PCT/US2018/043485 International Preliminary Report on Patentability dated Nov. 18, 2019, 21 pages.
Indian Patent Application No. 202027006059 First Examination Report dated Aug. 24, 2021, 7 pages.
European Patent Application No. 18837219.7, extended search and opinion dated Apr. 13, 2021, 7 pages.

* cited by examiner

Fig. 4  Solar PV voltage

SOLAR PV AND AC SOURCE POWER BLENDING CONTROLLER

RELATED APPLICATIONS

The present application is a continuation-in-part of U.S. patent application Ser. No. 16/634,058, filed 24 Jul. 2018 (now U.S. Pat. No. 11,171,486), which is U.S. national stage filing under 35 U.S.C. § 371 of International Patent Application No. PCT/US2018/043485 filed 24 Jul. 2018, which claims priority to U.S. Provisional Patent Application No. 62/536,161 filed 24 Jul. 2017, the entire contents of the aforementioned patent applications are incorporated herein by reference.

BACKGROUND

Commercial and industrial motor loads are commonly connected to the grid power through variable frequency drives (VFDs), which provide smooth power transition during start/stop times (soft start capability), as well as enable operational flexibility through speed control.

Most utilities and energy efficiency agencies offer incentives and rebates for commercial and industrial users, increasing the number of VFDs for motor applications like HVACs, water pumps, fans, compressors, conveyers, etc.

However, even with VFDs, the motor loads are still the biggest energy consumers, and one of the ways to offset the grid energy consumption is to use solar PV that is directly connected to the VFD's DC port, instead connected to the grid via inverter. The benefit is in higher system efficiency, as solar is injected in the DC power form, instead of converted into AC through a grid tied inverter, but another benefit is in easier installation, as there is no need to connect solar to the grid, thus no need for lengthy and costly regulatory process and paperwork.

SUMMARY

The proposed controller strategy Power Blending controller is for managing multiple parallel solar PV arrays on the input and providing a DC level output power that connects to the DC port of any off-the shelf variable frequency drive, which is then connected to the multi kilowatt motor load.

A strategy for such Power Blender controller results in real time management not only of maximum power generated from solar, but also the DC link voltage stability of a VFD's DC port when available solar power exceeds required motor load power. Same VFD is also powered from the AC source at the same time, and power is being blended (mixed) between the rectified AC source and solar DC source at the DC link level of the VFD. A merit of such system is in using solar power to directly offset the AC consumption at the load level, without a need to export the solar power to the grid at all. Ultimately, in this way solar power can also be used as a backup power, so even if the grid shuts down, a VFD can be powered off of solar power only ad still run AC loads, which is not the case with conventional grid tied solar inverters.

In an embodiment, an energy blending device has a first input for alternating current, a second input for connection to a solar array, and an output, the energy blending device receiving energy from the first input, both inputs coupled to power an energy blending node. The device is in a configuration either with the solar array matching voltage of the energy blending node, the blending node providing power through a DC-DC converter to a load interface device, and the solar array coupled through a DC-DC converter to the energy blending node, the energy blending node providing power to a load interface device. A microcontroller controls the DC-DC converter and a load interface device. The energy blending device has an energy storage system having a battery coupled either directly to the energy blending node or through a bidirectional energy storage interface to the energy blending node.

In another embodiment, a method of combining energy from solar panels, an AC source, and an energy storage device to operate includes passing energy from each of the AC source and the solar panels to an energy blending node, and passing energy in a direction selected from the group consisting of from the energy storage device to the energy blending node and from the energy blending node to the energy storage device, the direction selected according to available energy at the energy blending node and energy needs of a load. The method also includes passing energy from the energy blending load through a load interface device to the load.

In another embodiment, an energy blending device has a first input configured for alternating current, a second input configured for connection to a solar panel, and an output, the energy blending device includes a rectifier receiving the first input, the rectifier coupled through a first DC-DC converter configured for power factor correction and having a DC output coupled to an energy blending node, the voltage of the energy blending node being regulated at a pre-set value by the first DC-DC converter to match a maximum power voltage of the solar PV panels. The energy blending device also includes an output driving circuit coupled to receive power from the energy blending node through a second DC-DC converter, the output driving circuit selected from the group consisting of a variable-frequency motor driver, a third DC-DC converter, and an inverter; and a microcontroller coupled to control the first and second DC-DC converters. The second DC-DC converter regulates an input voltage for the output driving circuit.

DETAILED DESCRIPTION OF THE EMBODIMENTS

Figure 1:
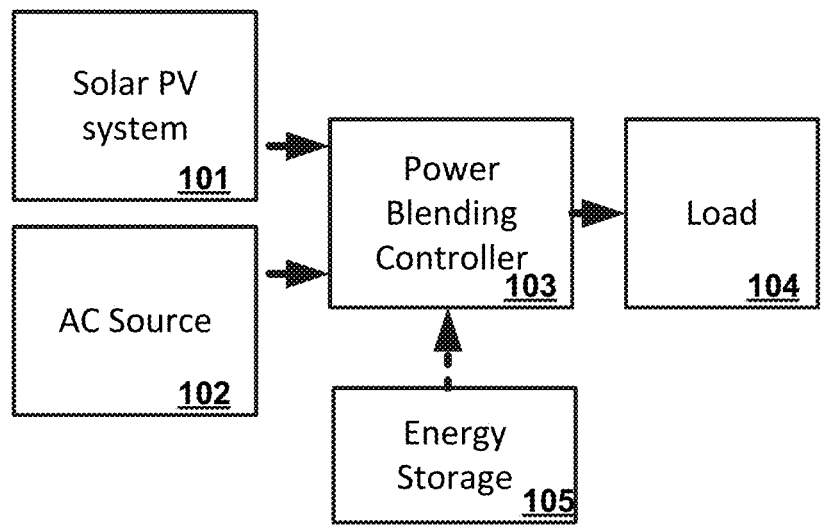
FIG. 1 is a block diagram of an embodiment of a system incorporating a Power Blending Controller (PBC) 103.

FIG. 1 is a block diagram of a system 100 incorporating a Power Blending Controller (PBC) 103, configured to receive input power from inputs that may include a solar PV system having a solar array of one or more PV panels 101, connected in series or parallel configuration. The PBC also receives input power from an AC source 102 that can be a single, two or three phase configuration AC source, the AC source may be selected from: the electrical grid, diesel or gasoline driven generators, micro hydro or wind driven turbines, and other sources. The power flow from the AC source is unidirectional, always from the AC source to the PBC. Output of the PBC 103 feeds either a DC or AC load 104 that may differ in voltage, frequency and phase (AC only) from the AC source 102. There is an optional energy storage component 105 that can be connected to the PBC unit, acting as an energy buffer to enable uninterruptable power supply for load 104, and operation of loads while minimizing load on the AC source at peak price times.

Typically, there is a load-dependent cost associated with power from the AC source, such as a utility company bill according to a recording kilowatt hour meter if the AC source is the AC power grid, or a fuel bill if the AC source is a diesel or gas-turbine generator, the PBC uses available solar power to reduce power used from the AC source thereby reducing grid kilowatt hours or fuel bills.

Figure 2:
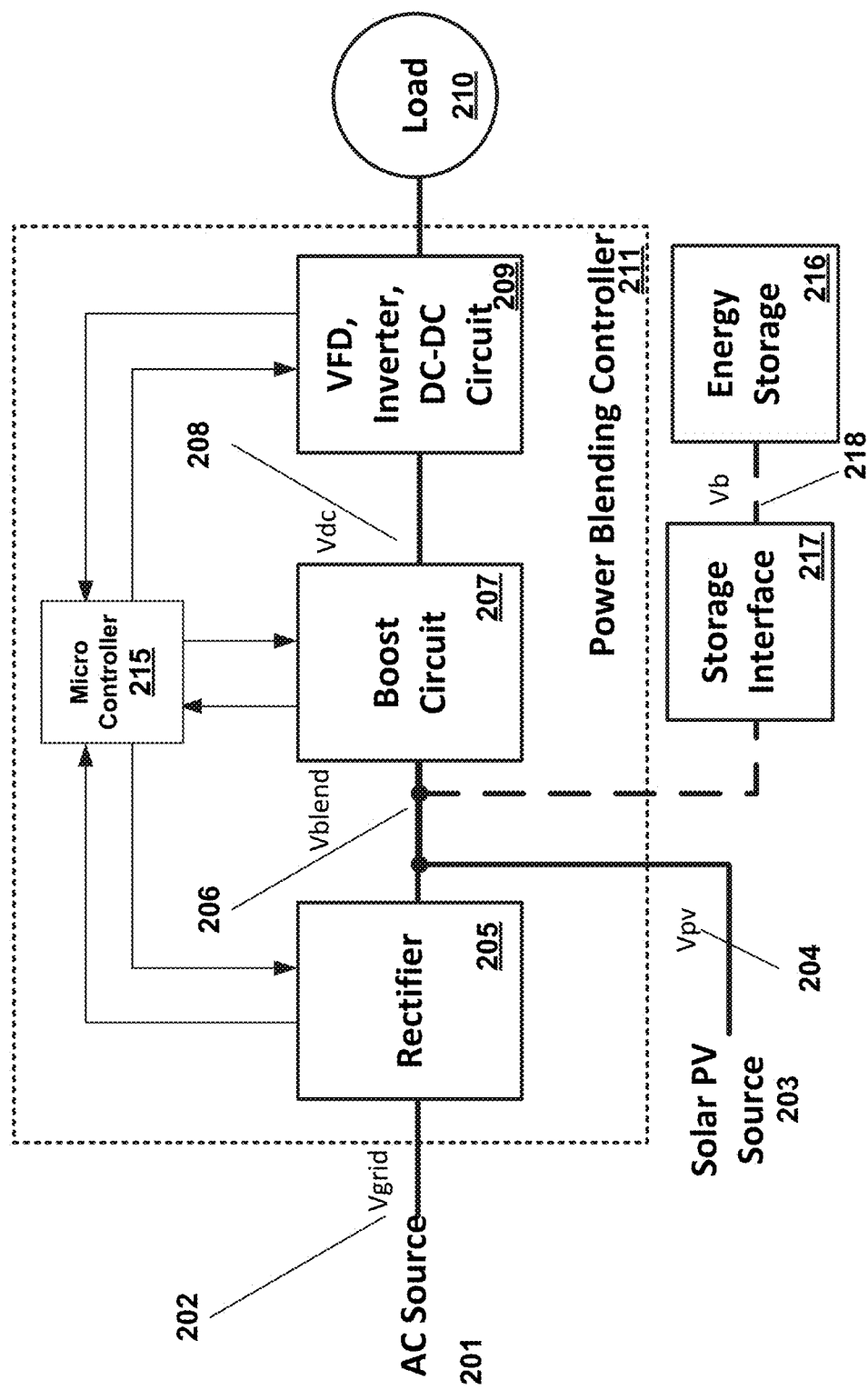
FIG. 2 is a detailed diagram of an embodiment of the controller from FIG. 1.

FIG. 2 is an example, more detailed diagram of an embodiment of the controller from FIG. 1. Single, two or three phase AC Source 201 with its input voltage of Vgrid 202 is one input to the Power Blending Controller 211. After Vgrid AC voltage is rectified using a passive diode rectifier or active rectification circuit 205, it provides Vblend 206, where it is merged with solar PV source's 203 output Vpv 204 through a blocking diode (not shown). Once the rectified AC source voltage and solar PV voltage are merged, power goes through boost circuit 207, to provide adequate higher Vdc voltage 208, than Vblend 206, which is an input for Variable Frequency Drive (VFD) or Inverter circuit 209. Single or multiphase VFD or Inverter circuit 209 adapts Vdc voltage 208 to provide proper power for AC load 210.

An optional energy storage circuit 216 through Storage interface 217 is coupled to the Vblend 206 voltage level to be coupled with both solar PV source 203 inputs and an output of the rectifier circuit 205, Vblend is then input for the boost circuit 207. Energy storage circuit 216 can be charged using rectified AC grid source in combination with Solar PV source power. It provides power to the boost circuit in combination with AC grid source and Solar PV source power, or solely when solar is not available, and AC source power is not affordable.

Energy storage 216 can be either a high voltage battery (battery voltage Vb>100 Vdc like a high voltage Li-Ion battery), where storage interface 217, 317, 619 includes a battery charge management circuit, or energy storage 216 can be a lower voltage Vb<12-60 Vdc battery, in which case the storage interface 217, 317, 619 includes a bidirectional DC-DC converter configured to step up battery voltage to the Vblend 206, 306, 608 voltage level when drawing power from the battery, and to step down power from Vblend 206, 307, 608 voltage to battery voltage Vb 218 when charging the battery, under control of microcontroller 215, 315, 615. In an alternative embodiment, storage interface 217, 317, 619 includes a first DC-DC converter adapted to charge the battery of energy storage 216, 316, 618 from energy blending node Vblend 608, 307, 206 and a second DC-DC converter adapted to draw power from the battery of energy storage 216, 316, 618 and provide energy to energy blending node Vblend 206, 307, 608, the active DC-DC converter and amount of current drawn both under control of microcontroller 215, 315, 615. The microcontroller 215, 315, 615 has firmware configured to enable the microcontroller to determine an energy demand of the load and an availability of energy at Vblend the energy blending node, and to divert excess energy from Vblend to charge the battery of the energy storage, and to make up an energy deficit at Vblend by transferring energy from the battery to Vblend.

In an alternative embodiment a DC/DC converter replaces VFD or Inverter 209 and provides power to DC load 210. However, it is also possible to have a Vdc being an output from boost circuit 207, directly feeding a load, without having VFD/Inverter, or DC-DC circuit. The VFD/Inverter or DC-DC circuit being a load interface device adapted to adapt power from the blending node to provide suitable voltage and frequency as needed to power the load. A Microcontroller 215 is integral part of the Power Blending Controller 211, with feedback and control signals to and from: rectifier 205, boost 207 and VFD/Inverter 209 or DC/DC circuits. Feedback signals that are inputs for microcontroller 215 include sensors for current, voltage, frequency, temperature, etc. while control signals from microcontroller 215 are controlling power switches (MOSFETS and IGBTs) that carry out power conversion between AC 201 and Solar source 203 on one side, and AC or DC load 210 on the other.

Figure 3:
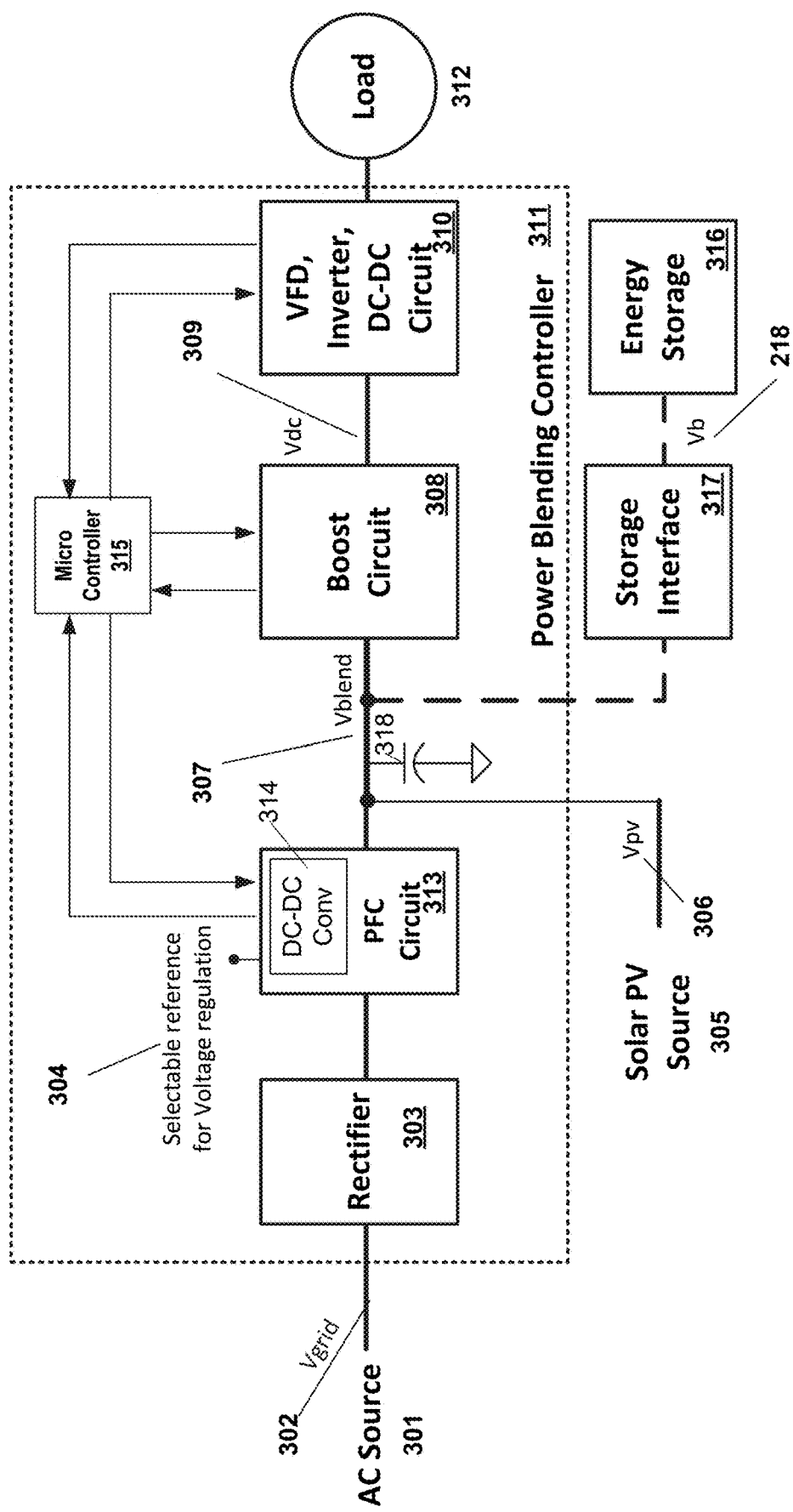
FIG. 3 is a block diagram of another example of an embodiment of the power blending controller.

FIG. 3 illustrates another exemplary embodiment of the power blending controller. AC Source 301 with its input voltage of Vgrid 302 is input to the Power Blending Controller 311. Vgrid (grid supply voltage) is an input to the rectifier circuit 303, which is either single or three phase, depending on the AC source. In particular embodiments, rectifier 303 is connected to a Power Factor Correction (PFC) circuit 313 that aligns sinusoidal waveform of electrical grid voltage (Vgrid), with grid current; so that AC or DC loads 312 look to the grid as a resistive load during most operation. This PFC circuit includes a DC-DC converter having a selectable reference Vref 304 (provided by microcontroller) for regulating a Vblend voltage 307.

In a particular embodiment, this Vref voltage is chosen to match a solar voltage of coupled solar PV source in order to maximize solar power. The PFC circuit reads input AC Source 301 voltage waveforms, and controls its internal DC-DC converter 314 in order to overlay its AC current waveform against AC voltage waveform, to result in unity power factor, so that phase angle between the AC source 301 voltage and AC current waveforms is zero while providing pulsating DC onto Vblend 307. A fitter capacitor 318 on Vblend may be provided to store energy between half cycles of the AC source 301 and permit boost circuit 308 and variable frequency drive 310 operation asynchronously to the AC source 301 frequency.

In some embodiments having a PFC circuit 310 with a boost-type DC-DC converter 314, the Vref signal at which PFC regulates the voltage is higher than a square root of two (SQRT(2)) times the root-mean-square (RMS) input AC voltage source. In some embodiments, it is possible to use either 120 Vac or 230 Vac source as an input to the PFC circuit. Hence, it's possible for 230 Vac motor loads to be driven off of Power Blending Controller (PBC) even when connected to an 120 Vac AC source, because the DC-DC converter boost circuit inside the PBC adjusts the PFC output voltage to the higher voltage for VFD to control higher voltage motors.

In alternative embodiments, PFC circuit 310 may include a buck-boost DC-DC converter 314 and boost circuit 308 includes a voltage-increasing DC-DC converter, permitting greater flexibility of array voltage, output voltage, and AC supply voltage.

Solar PV source 305 has its output Vpv 306 coupled to Vblend, in embodiments through a blocking diode. Vblend in turn powers boost circuit 308 that powers Variable Frequency Drive (VFD) or Inverter circuit 310. VFD or inverter circuit 310 in embodiments can be a single or multiphase variable frequency drive to provide proper power for AC load 312. VFD or inverter circuit 310 can also be a DC/DC converter adapted to provide power to DC load 312. It is also possible to directly connect some DC loads to boost circuit 308, directly feeding a load.

A Microcontroller 315 is an integral part of the Power Blending Controller 311 and has feedback and control signals to and from: PFC circuit 313, boost circuit 308 and VFD/Inverter or DC/DC 310 circuits. Feedback signals input to microcontroller 315 provide information of current, voltage, frequency (at AC load), temperature, etc. while control signals from microcontroller 315 control power switches (MOSFETS and IGBTs) that carry out power conversion between AC 301 and Solar source 305 on one side, and AC or DC load 210 on the other. Furthermore, control signals from microcontroller 315 to Rectifier 303 with PFC circuit 313 set a reference for voltage regulation, which essentially regulates Vblend voltage—307.

An energy storage circuit 316 and storage interface 317 have the same functionality as corresponding energy storage 216 and storage interface 217 in FIG. 2.

Figure 4:
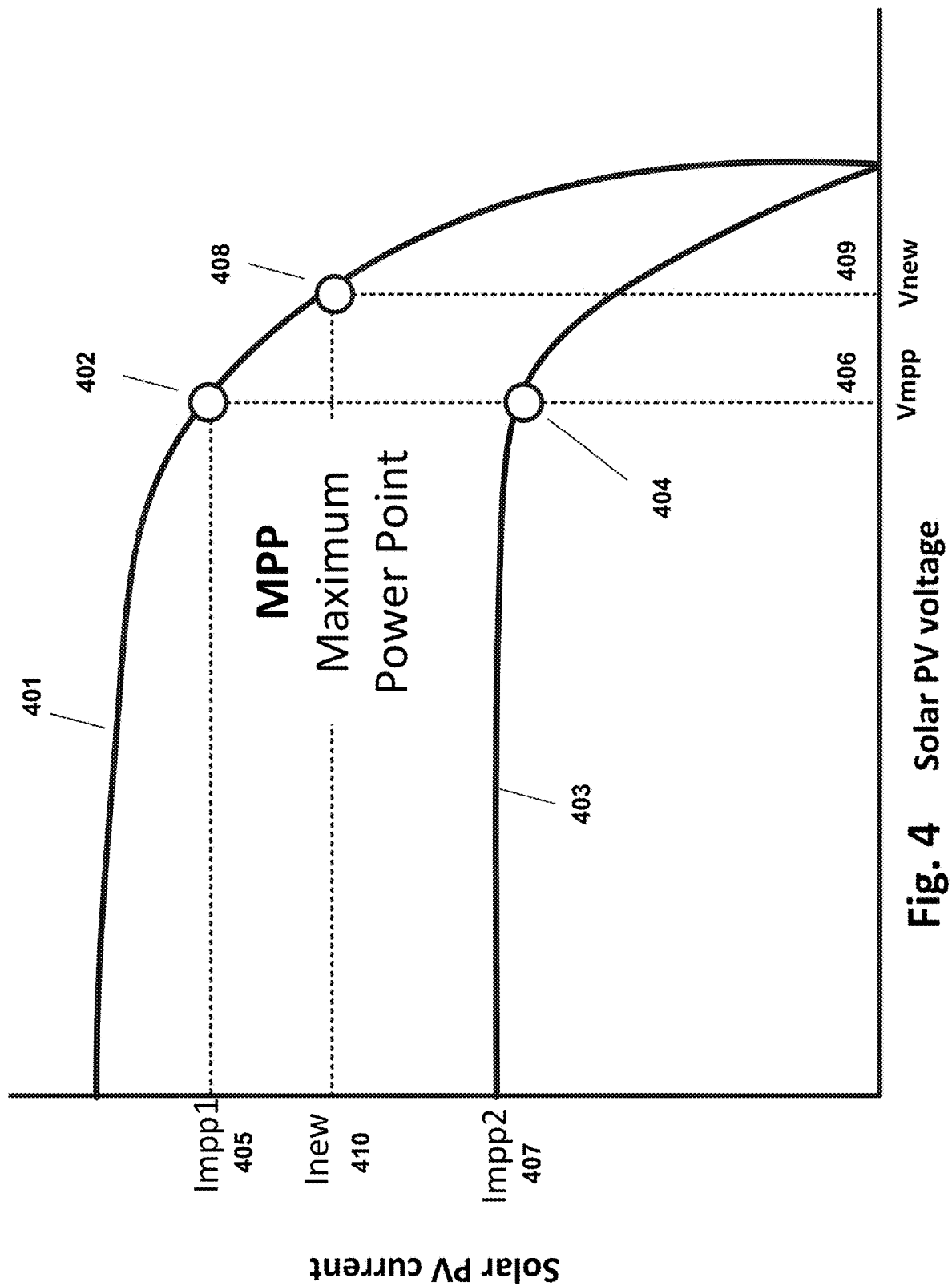
FIG. 4 illustrates typical voltage-current curves of a solar PV panel showing the maximum power point MPP 402 at Impp 405 with Vmpp 406.

FIG. 4 illustrates typical voltage-current curve of one solar PV panel. Solar PV voltage is on X-axes, while solar PV current is on Y-axes. There are two different solar PV curves provided: 401 and 403. Curve 401 corresponds to higher solar irradiation, while 403 corresponds to a lower solar irradiation value. Maximum power point for 401 curve is at MPPT point 402 with current at maximum power point (Impp1) 405 value and voltage at maximum power point (Vmpp) 406 value, while a second maximum power point for curve 403 is shown at 404 with Impp2 current 407 and same Vmpp 406 voltage value.

The microcontroller 215, 315, 615 periodically seeks for any adjusted maximum power point. In doing so, it tries drawing more or less current at a greater or lesser voltage from the array by adjusting factors such as Vref. For example, it may try increasing Vref so Vblend increase to Vnew 409, testing operation at point 408. Point 408 is outside the maximum power for curve 401, where solar voltage Vnew 409 has higher value than Vmpp, but solar current Inew 410 (the array current at Vnew) has lower value than Impp1. As a result, power at point 408 results in lower power than power at point 402, although they are both on the same solar curve 401. And hence, a power at point 404 results in lower power than power at 402, because point 404 is on lower irradiance curve 403 than point 402. Should the microcontroller try a power point such as Vnew, and find that power available is decreased while power is demanded by the load, the microcontroller backs off to its original Vref.

Figure 5:
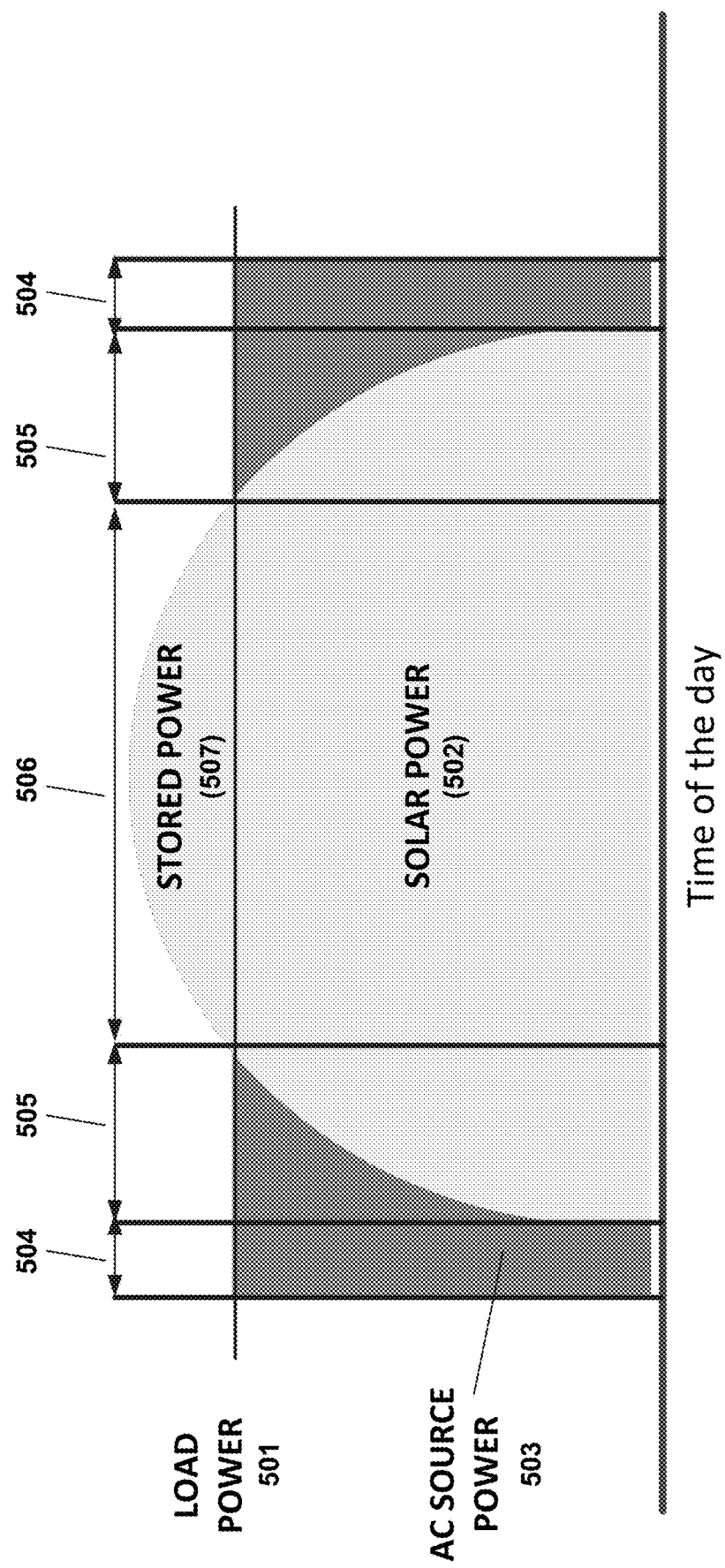
FIG. 5 illustrates times of the daily operation of the system with solar power 502 and AC source power 503 sources controlled by power blending controller, when supplying power for a given load power 501.

FIG. 5 shows daily operation of the system including solar power 502 and AC source power 503 sources controlled by power blending controller, when supplying power for a constant load power 501. During intervals of darkness 504 when the sun is down, power to the load is provided by AC source only, while in intervals 505 where the sun is up, but solar output fails to meet full needs of the load, the power is blended between AC source 503 and solar PV power 502. Lastly, during time intervals 506 where plentiful solar power is available, the entire load power is provided by solar PV power 502, and excess power that is not utilized by the load is stored in energy storage 216, 316, 618—as stored power 507.

Figure 6:
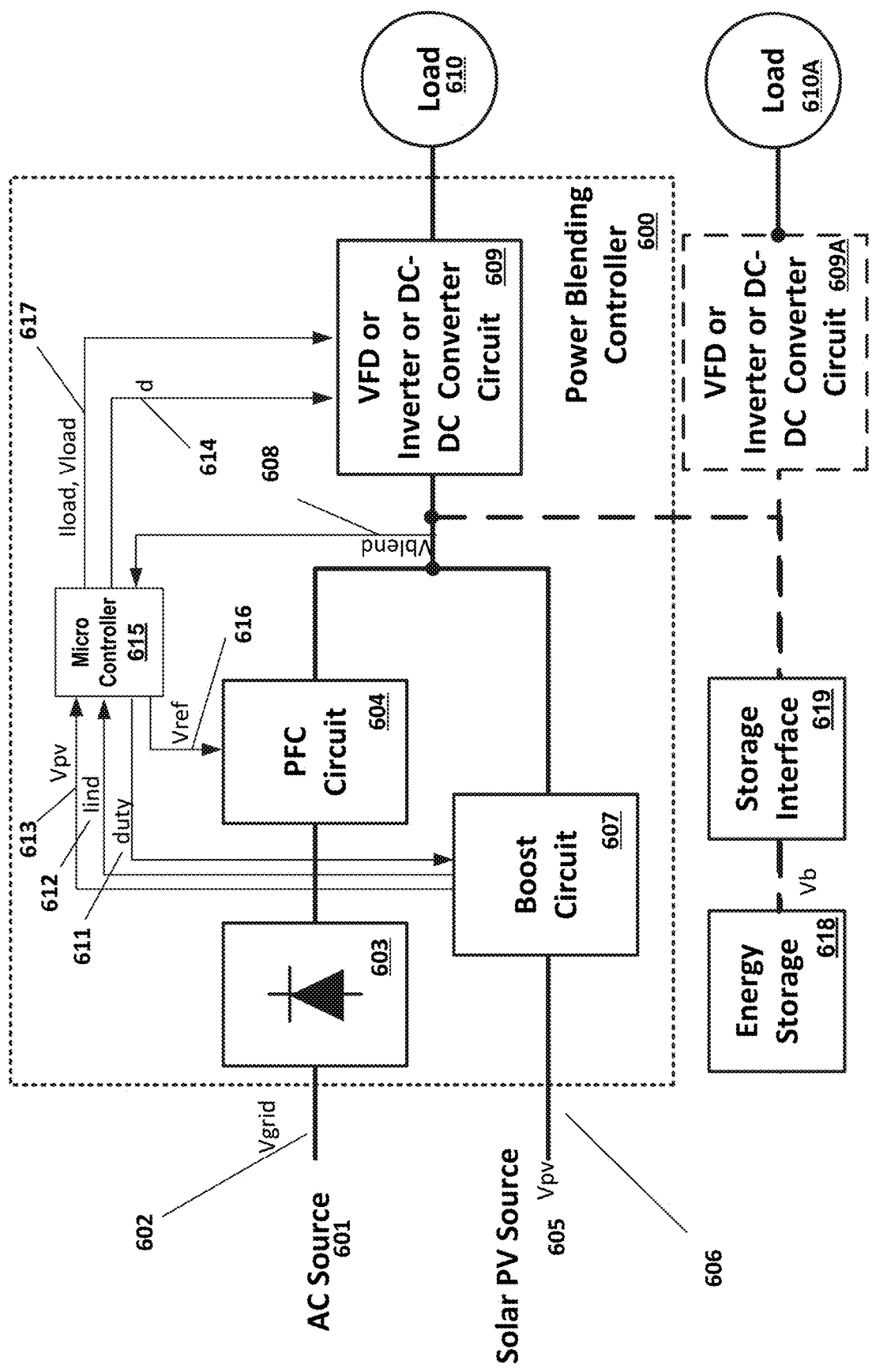
FIG. 6 is a detailed diagram of another embodiment of a system incorporating a Power Blending Controller (PBC) 700 with a motor load output.

FIG. 6 is a block diagram of an alternative embodiment of the power blender controller topology. Single phase AC Source 601 with its input voltage of Vgrid 602 is one input to the Power Blending Controller 600. Vgrid is an input to the rectifier 603 and rectified voltage feeds PFC circuit 604. This PFC circuit 604 receives a reference signal for output voltage regulation Vblend 608, so that voltage is regulated at that value. At the same time solar PV source's 605 with its voltage Vpv 606 presents an input for boost circuit 607 including power switches, in most embodiments MOSFETs controlled to boost the voltage, from Vblend 608 voltage to a suitable input voltage for Variable Frequency Drive (VFD) or Inverter circuit 609, which can drive a single or multi-phase AC load 610. A Microcontroller 615 is an integral part of the Power Blending Controller 600 and has feedback and control signals to and from: rectifier with PFC 604, boost 607 and VFD/Inverter or DC/DC 609 circuits, as well as Vblend 608 parameters. Feedback signals that input to microcontroller 615 provide information about current solar PV parameters: solar panel current (Ipv) and solar panel voltage (Vpv) 613, Boost inductor current (Iind) 612, and load current (Iload) and load voltage (Vload) and load frequency (Fload) parameters 617. There are control signals from microcontroller 615, that control power switches (MOSFETS and IGBTs) that carry out power conversion between AC 601 and Solar source 605 on one side, and AC or DC load 610 on the other. A microcontroller signal that controls boost circuit 607 is duty 611, while microcontroller provides a reference voltage (Vref) 806 that controls PFC circuit 616, defining a voltage level at which PFC circuit regulates the DC link voltage: Vblend 608. Lastly, microcontroller uses signal d for controlling operation of VFD/Inverter or DC/DC converter circuit 609, depending on the load 610 Power Blending Controller is attached to. In other embodiments having a lower Vblend voltage, PFC circuit 604 may include a buck-type DC-DC converter and boost circuit 607 may be a buck or boost DC-DC converter as appropriate for output voltages of the solar PV source 601.

Microcontroller 215, 315, 615 is configured with a real time clock circuit and may be configured with user-entered data regarding scheduled times of low, medium, and peak electricity prices. The real time clock is compared to scheduled or broadcast times of peak electricity prices to determine whether stored energy from energy storage 618 or energy from the AC source 601 is to be used to make up energy deficits at Vblend 608 due to more energy being drawn by VFD/DC-AC Inverter/DC-DC converter circuits (load interface circuits) 609, 609A than provided by solar PV source 605.

In alternative embodiments, Vblend 608 may provide power to additional VFD/DC-AC Inverter/DC-DC converter circuits 609A adapted to provide power to additional loads 610A. In an exemplary embodiment, one VFD/DC-AC Inverter/DC-DC converter circuits 609 provides power to a load 610 including an AC motor through a variable-speed and variable-voltage drive, and a second VFD/DC-AC Inverter/DC-DC converter circuits 609A provides power to a load 610A at fixed frequency and voltage; in this embodiment load 610A includes desktop computers and lights where operation at reduced frequency or voltage (such as may be provided by VFD 609 to motor load 610) could cause undesired resetting of computers and flickering or dimming of lights.

In a particular embodiment, microcontroller 615 is configured with firmware in a memory of microcontroller 615 to prioritize loads and to drive intermittent-duty loads in a coordinated manner. For example, if two VFD converter circuits 609 are provided driving two motor loads 610, the microcontroller 615 may be configured to operate these loads alternately when available solar power is insufficient to operate these loads simultaneously. The microcontroller 615 may also be configured to operate a high-priority load whenever the load desires power, and to operate a second lower priority load only when solar power is sufficient to run both loads or when grid power is cheap.

It is anticipated that the embodiments illustrated in FIG. 2 and FIG. 3 may also power multiple loads having separate VFD/DC-AC inverter/DC-DC converters coupled to the output 209, 309 of boost circuit 208, 308, or through separate boost circuits to Vblend 207, 307.

In a particular exemplary embodiment of the embodiment of FIG. 6, a first VFD/DC-AC inverter/DC-DC converter load interface device 609 is adapted to run a 220V well pump configured to fill a cistern with variable voltage, variable frequency AC motor drive, a second load interface device 609A is a fixed-voltage, fixed-frequency DC-AC inverter adapted to run lights and a computer, a third load interface device (not shown) is a variable frequency AC motor drive adapted to run a 110V refrigerator motor, and a fourth load interface device is a DC-DC converter adapted to run a 12-volt boost pump from cistern to a water system. In this embodiment, microcontroller 315 is configured to prioritize loads, conserving sufficient charge in the energy storage 618, so that a high priority load such as the lights and computer always have power even when both AC power and solar power are unavailable for at least a predetermined backup power operating period, and to operate the well pump when AC power is cheap, solar power is plentiful, and the cistern is below full, or when the cistern is less than a minimum level despite pricing of AC power.

In order to conserve sufficient charge in the energy storage 618 so that the high priority load always has power even when both AC power and solar power is unavailable, the energy storage 618 is equipped with battery charge status monitoring devices coupled to provide a charge state to microcontroller 615, An energy storage 618 and storage interface 619 can be added optionally with the same functionality as previously described with reference to energy storage and storage interface of FIGS. 2 and 3.

Figure 7:
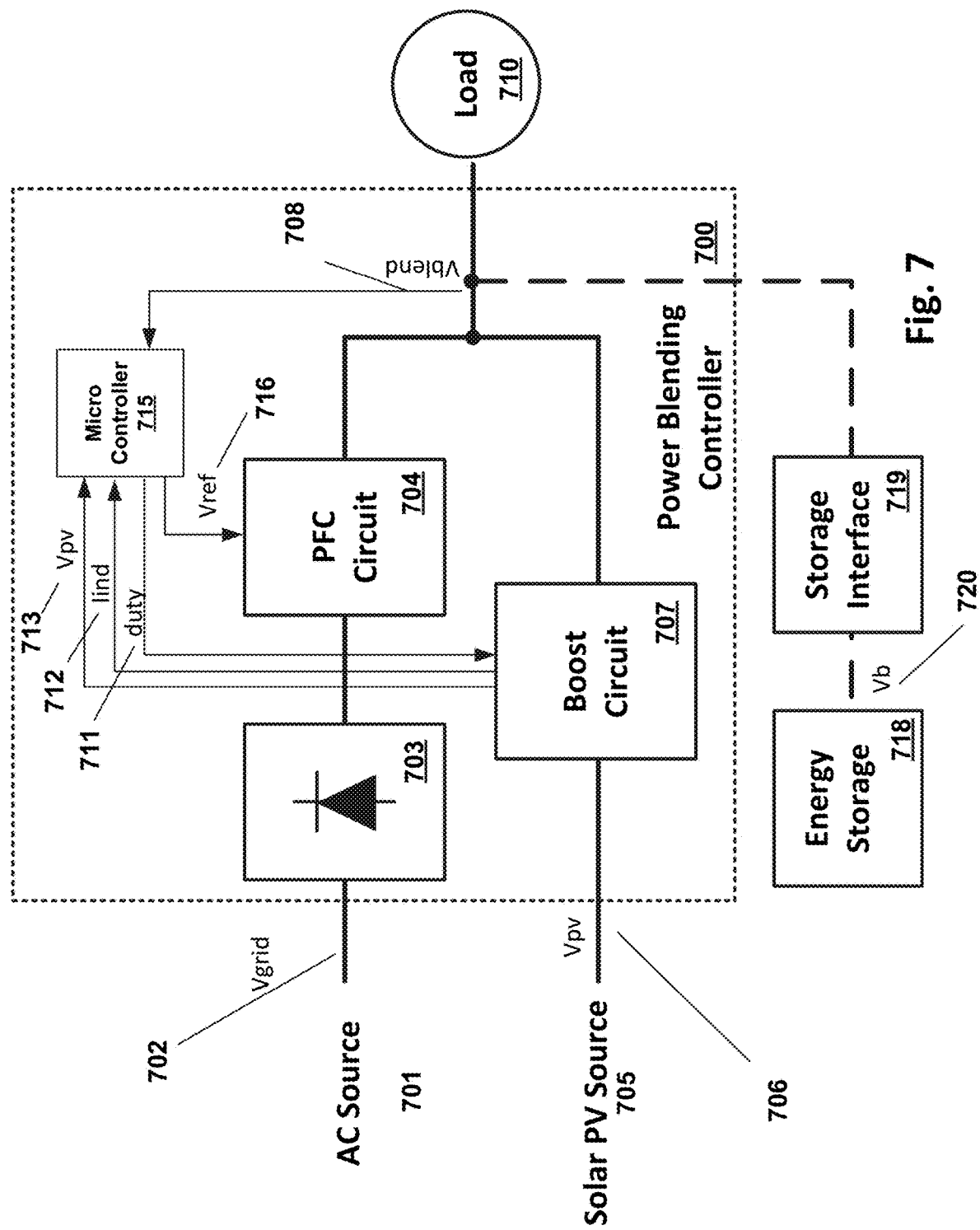
FIG. 7 is a detailed diagram of an embodiment from FIG. 6 with direct DC output port.

It is also possible to couple a load directly to Vblend 608, in which case the load is connected directly to Vblend 708, as shown on FIG. 7.

Figure 8:
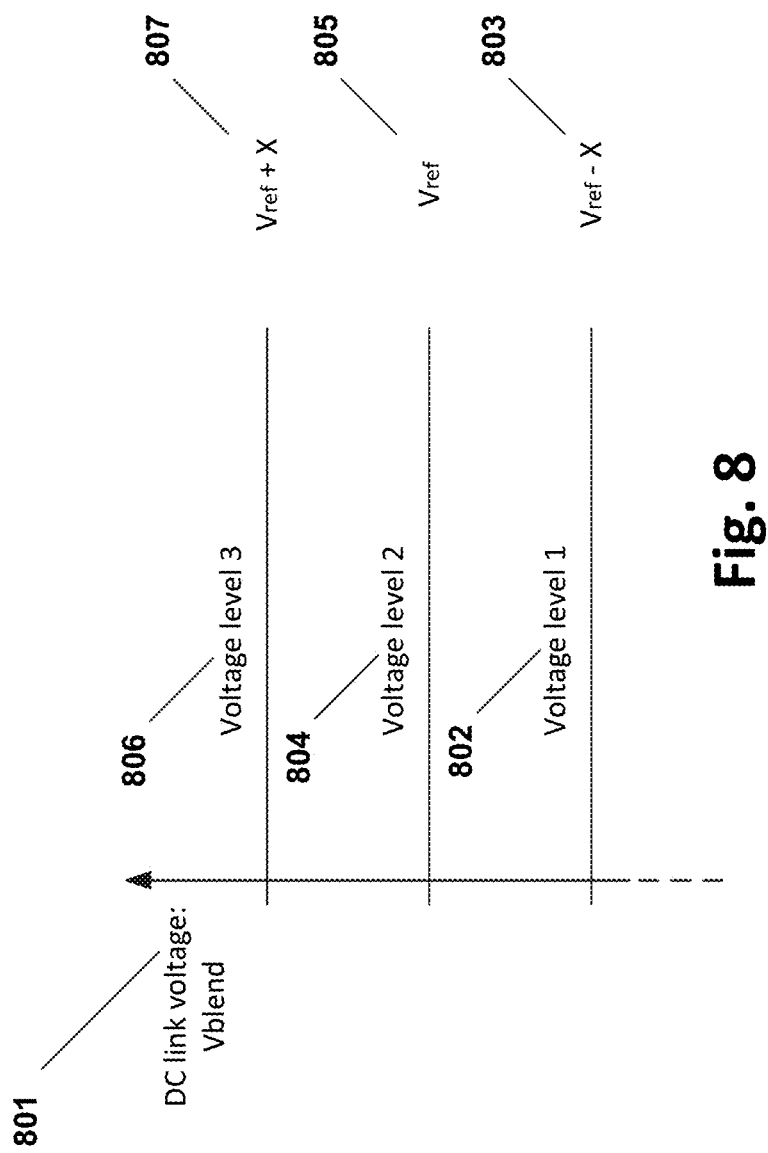
FIG. 8 is a block diagram of voltage levels used for blending node regulation.

FIG. 8 shows different voltage levels for blending voltage Vblend 801 regulation, depending on which controller is regulating the DC link blending voltage at which given time. At voltage level 1 802 the Vblend voltage is regulated at Vref−X value 803, where Vref 805 is voltage level 2 804 at which the PFC circuit is regulating the V blend voltage. X is a constant which can vary depending on the load. At a voltage level 3 806 the Vblend voltage is regulated at Vref+X value 807.

Figure 9:
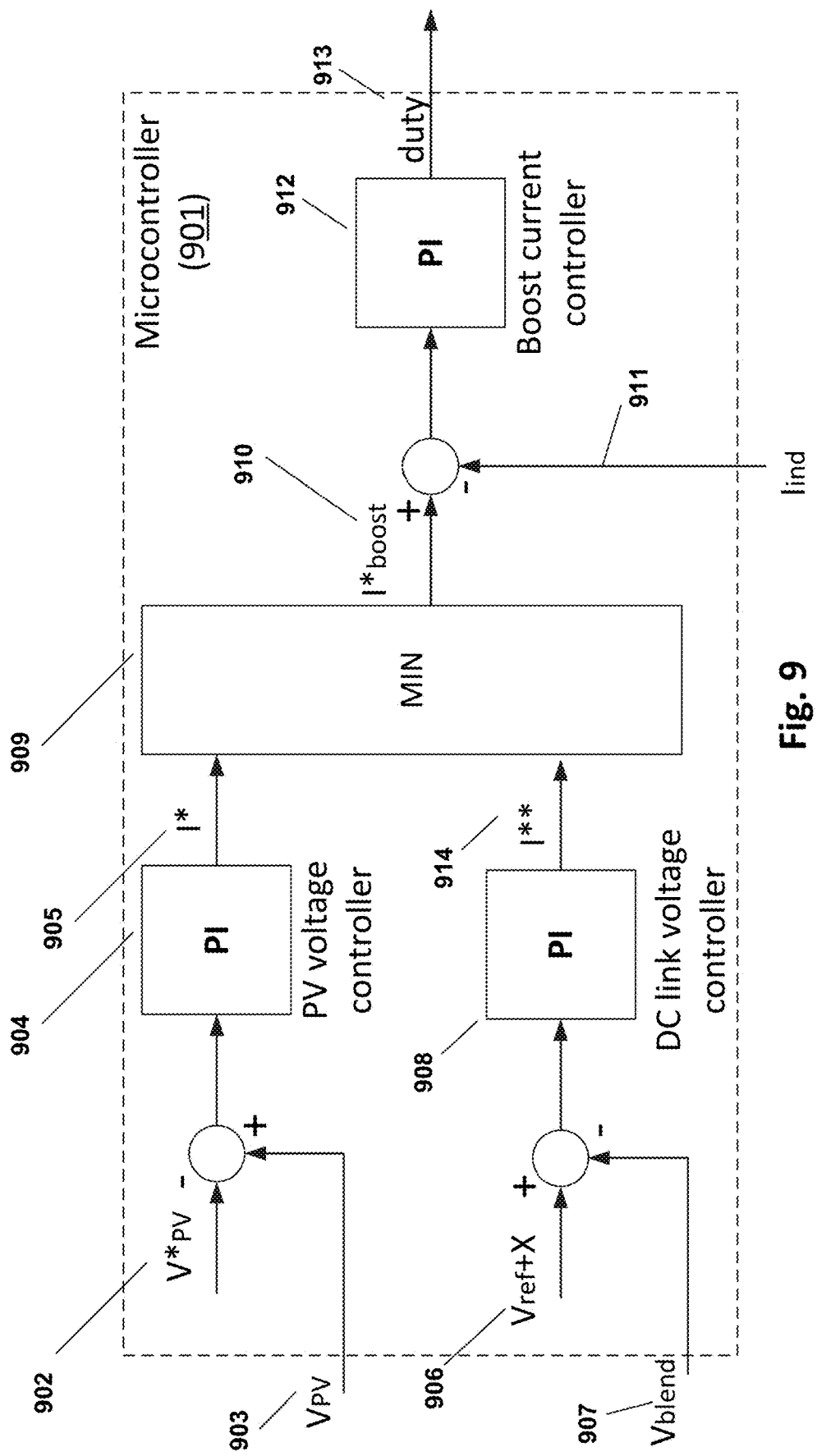
FIG. 9 is a control diagram of power blending algorithm that controls DC-DC boost converter interfacing solar source input.

FIG. 9 illustrates a control principle of the blending method implemented in the microcontroller 901. Inputs to the controller are solar PV voltage measurement 903, blending voltage measurement Vblend 907 and inductor current measured at the boost circuit interfacing the solar PV system 911.

Error between measured solar PV voltage VPV 903 and reference voltage V*PV 902 is an input for the PI voltage controller 904, which uses certain proportional (P) and integral (I) gains to calculate reference current I* 905. Similarly, error between measured DC link blended voltage Vblend 907 and reference DC link voltage Vref+X 906 is an input for the PI DC link voltage controller 908, which uses different proportional (P) and integral (I) gains to calculate reference current I** 914.

Both reference currents I* and I** are inputs for MIN logical block 909, which outputs I*boost reference 910, that is compared with input Lind current 911. Error of the I*boost and Lind is run through another PI boost current controller 912, which results in duty ratio 913 signal that is used for controlling power switches of the boost circuit (607 of FIG. 6).

Figure 10:
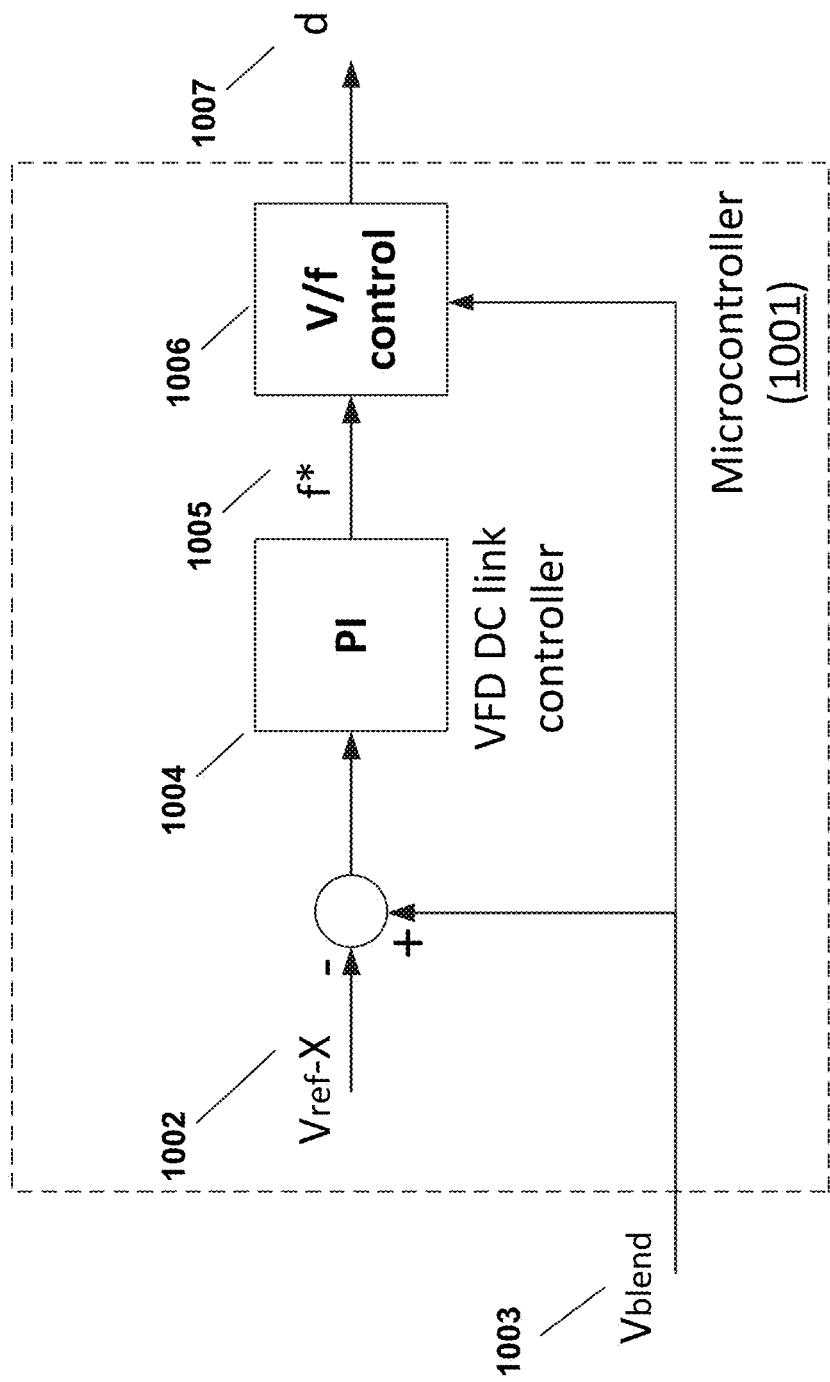
FIG. 10 is a control diagram of variable frequency converter algorithm that runs output motor load.

FIG. 10 illustrates how, in the microcontroller 1001, the VFD circuit regulates DC link voltage Vblend at a voltage level 1 802 from FIG. 3 at a value of Vref−X 803. The difference between Vref−X 1002 and actual Vblend 1003 voltage is an input to the PI VFD DC link controller 1004, which provides reference frequency f* 1005 for a voltage/frequency (V/f) VFD control method 1006 that results in duty cycle d 1007, which VFD uses to run the motor load.

Figure 11:
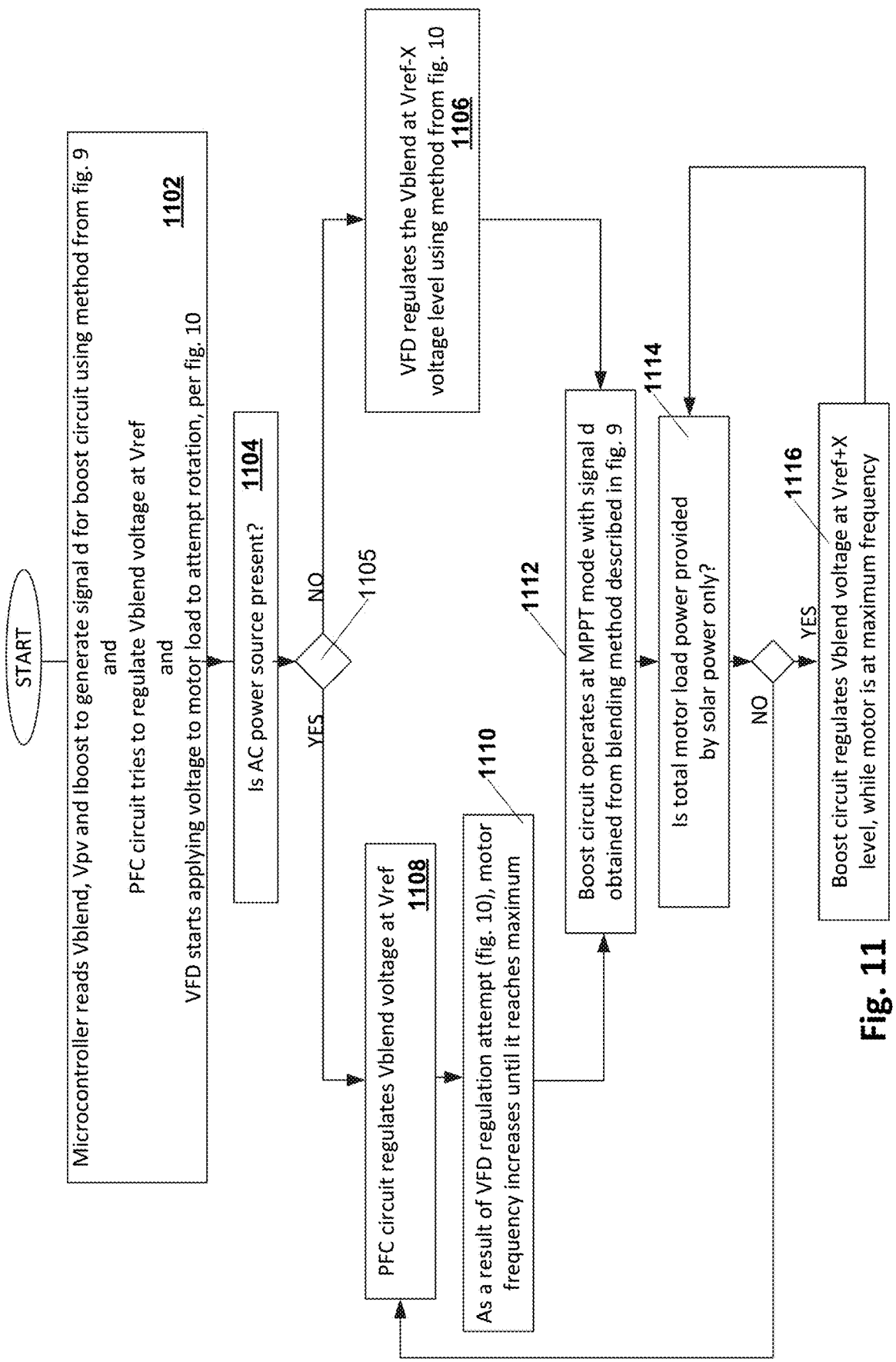
FIG. 11 is a flowchart illustrating a method used for controlling the embodiment shown in FIGS. 6 and 7.

FIG. 11 is a flow chart used by the microcontroller to execute power a blending method for the topology described in FIGS. 6 and 7 at the time of motor start. Microcontroller reads Vblend, Vpv and Iboost and calculates 1102 a duty-cycle signal d for boost circuit 607 using the method described above with reference to FIG. 9. Simultaneously, the PFC circuit tries to regulate Vblend voltage at Vref and the VFD starts applying voltage to motor load to attempt rotation, according to the method describe above with reference to FIG. 10.

If 1104 the AC source is present, the VFD increases motor voltage and frequency to nominal voltages and frequency for the motor while the PFC circuit maintains Vblend 1106 as previously discussed with reference to FIG. 10. If 1104 the AC source is not present, the VFD applies available power to the motor 1108, effectively regulating Vblend at Vref−X, until either the motor starts, or a timeout occurs. If a timeout occurs, the VFD shuts down and waits for a predetermined time before re-attempting motor start. In an alternative embodiment, the microcontroller may request that an AC generator used as AC source 601 start operation before next re-attempting motor start. Once the motor starts, motor operating frequency is increased 1110 until full nominal voltage and frequency are reached or the maximum available solar power is used.

As the motor starts, the boost circuit 607 operates 1112 in MPPT mode with duty cycle signal d as determined according to the method previously discussed with reference to FIG. 9. If 1114 the motor load is not solely operated by solar power, the PFC circuit maintains Vblend 1106 as previously discussed with reference to FIG. 10; if 1114, the motor load can be solely supplied by solar power, boost circuit 607 regulates 1116 Vblend voltage at Vref+X level, while the motor load continues operating at either nominal frequency or the frequency at which power consumed by the motor matches the available power from the solar array.

Power blending controller (PBC) 103 (FIG. 1) has two inputs. First is solar photovoltaic power source 101, including an array of one or more photovoltaic panels coupled in series, parallel, or series-parallel to provide a DC (Direct Current) output to the PBC. The other input is from an AC source 102, which can be single or multiphase phase electrical grid, diesel or gasoline powered generator, or a micro hydro, gas, or wind turbine driven generator. AC source 102 in some embodiments is a generator configured to operate at request of a microcontroller, such as microcontroller 615 (FIG. 6), of power blending controller 103, and operates when solar power and energy storage reserve power together are insufficient to maintain a desired minimum standard of service of operating loads 104. Output of the power blending controller is adapted to drive one or more DC or single or multiphase AC loads 104.

FIG. 2 presents an option for power blending controller architecture where solar PV system 203 output is connected to the rectified AC source voltage Vblend 206. Solar PV panels 203 are connected in series and parallel to give a maximum power point voltage (Vpv) that matches rectified grid voltage Vblend 206. A solar array having a number of solar PV panels connected in series is determined as n (series panels)=Vblend/Maximum Power Point Voltage of a panel (Vmpp) 406 (FIG. 4) of the panels used in the Solar PV source array. If Vmpp of a given solar PV panel is X, and AC source voltage is 120 Vac grid, then a minimum number of the solar PV panels used should be at least 1.41*120/X. This way rectified AC source voltage Vblend—206 (in a particular embodiment: 1.41*120) fixes the solar PV voltage value, so that solar PV current is changing with solar irradiance. The number n of series solar PV panels can be higher than 1.41*120/X.

Optional energy storage can be added to the system, as shown in FIG. 2. The energy storage 216 is connected to the input of the boost circuit via bidirectional storage interface block 217 and can store excess power from solar PV source to feed boost circuit 207 in time periods when solar power from solar source 203 is insufficient to operate load 210 under control of microcontroller 215. Alternatively, microcontroller 215 can direct energy storage interface block 217 to use AC source power to charge the energy storage 216, so that power can be fed to boost circuit 207 at a later time. Such mechanism is useful for "peak shaving" to reduce power consumption during the peak-priced hours of AC grid power, where a Power Blender Controller with energy storage can provide uninterrupted load operation while managing solar power and energy storage, making sure that overall power draw from the grid during peak hours is below a threshold that triggers unduly high demand charges for the customer.

Furthermore, the energy storage 216 can be used for uninterruptable power supply for the load by storing excess solar energy unused by the load during peak sun times and AC source 201 fails. In this embodiment, the microcontroller 215 of the power blending controller may be configured to maintain a minimum charge level in the energy storage 216 for providing uninterruptable power to high priority loads during power failures. Microcontroller 215 does so by configuring the power blending controller 103 and boost circuit 207 to draw power from AC source 205 as needed to operate the load when solar power is insufficient.

Storage interface 217 is a bidirectional DC-DC converter that enables use of low voltage batteries, as its DC-DC topology enables low voltage batteries to receive power from, and deliver power to the high voltage Vblend circuit level.

FIG. 3 shows another embodiment for a power blending controller architecture where solar PV 305 power is merged with rectified AC source 301 power on the output of the additional rectifier with Power Factor Correction—PFC 313 component. The PFC circuit has selectable reference 304 as an input for voltage regulation of PFC. That way, the voltage regulation level is chosen to match PV maximum power point voltage—Vmpp 506. As a result, an output of the PFC circuit—Vblend 307 is regulated by PFC circuit. Furthermore, reference voltage regulation set point 304 is controllable by either an external analog signal or from microcontroller 315 to track in realtime a maximum power point of panels. As a result, PFC circuit regulates Vblend 307 voltage at a set maximum power point voltage level. Microcontroller 315 also controls boost circuit 308 to regulate Vdc voltage 309 at level that matches the correct input for VFD/Inverter or DC-DC circuit 310 for a given load 312. It is also possible to directly couple a high voltage DC load to Vblend. Hence, DC loads can directly be connected to the output of the boost circuit 308 that is regulated Vdc voltage.

The number of Solar PV panels 305 connected in series is determined by the maximum power point voltage of the PV panels and AC source voltage. In an example, if Vmpp of a given solar PV panel is X, and AC source voltage is 120 Vac grid and the rectifier has an output voltage 1.41*120 Volts, then a minimum number N of the solar PV panels should be at least 1.41*120/X. In this this way rectified AC source voltage Vblend—307 (in a given example: 1.41*120) fixes the solar PV voltage value at a maximum power point level, so that all available solar PV current is used. The number of solar PV panels can be higher than 1.41*120/X. The selectable reference for voltage regulation is chosen so that regulated voltage Vblend 307 on the output of the PFC circuit 313 is adapted to the number of solar PV panels connected in series times the panels' Vmpp. The programmable power factor correction circuit, including a DC-DC converter, gives a rectified output voltage adjustable to match array Vmpp 506, and is controllable by microcontroller 315 where voltage regulation reference is set once for a given solar PV panels, or reference can change with solar irradiation, to match Vmpp 506 in real time. In an alternative embodiment dual-inline (DIP) switches may be used to configure the converter instead of a microcontroller.

Once solar PV power 305 is "blended" with rectified AC source power 302 at the Vblend 307 node, then boost circuit 308 accommodates an appropriate DC link voltage level 309 that VFD or inverter circuit 310 will be fed from to in turn power AC or DC loads 312. This way, the PFC circuit provides rectified AC source power at the correct voltage level for blending with Solar PV source at the maximum power point voltage of the solar array.

Again, an optional energy storage can be added to the system, as shown in the FIG. 3, in the same manner as in FIG. 2.

FIG. 5 shows power blending during the course of one cloudless day, where the X-axes represent the time of the day. Power blending controller is powered by solar PV 502 and AC source 503 while supplying power to the load with certain load power 501. At the beginning of the day, before sun comes out, the total load power 501 is supplied from AC source 503, which is shown during intervals of darkness 504. As the sun comes out, the solar power 502 contributes to the power blend, and solar PV voltage value—Vmpp 406 is dictated by the rectified AC source voltage Vblend while AC source is providing more than 50% of load power, for the topologies shown in the FIG. 2. However, for the power Blender topology shown in FIGS. 3, 6 and 7, the blended voltage Vblend is regulated by PFC circuit powered by AC source. As the sun irradiance increases solar PV power contributes more to the load power, which is caused by solar PV current increasing its value from Impp2 to Impp1.

As soon as solar PV source takes over the load power 501 and starts providing more than 50% of its power, the solar PV voltage changes from rectified AC source value to the new value determined by the solar PV curve—Vnew 409, which is only for topologies shown in the FIGS. 2 and 3. At that point the new solar PV current is Inew 510, so that Inew*Vnew is higher than load power 501. During the time 506 only solar PV is providing the power to the load, and Vblend voltage equals solar PV voltage, which is changing due to solar PV current change resulted by solar irradiance. At any given time, during the period 506, Inew*Vnew is higher than load power 501. For topology shown in the FIGS. 6 and 7, the blended voltage Vblend is regulated by boost circuit powered by solar.

If optional energy storage block is added to the system, excess solar power: Pexcess=Inew*Vnew−Pload is used to charge the energy storage during the period 506.

During the intervals 505 again, solar PV system start decreasing contribution in power blending, so that AC source power 503 takes over, and solar PV voltage value Vblend 206 drops back to rectified AC source value, which is same as the Vmpp 406 value of the solar PV system. As the sun irradiance decreases the Vmpp does not change much, but solar PV current drops from Impp1 to Impp2, and eventually goes to zero, at which point AC source provides total power to the load again—such as during time intervals of darkness 504.

Solar PV system in this case is sized so that its Vmpp 406 voltage is the same value as rectified AC source voltage or 5% less for the topology from FIG. 2, while Vmpp 406 voltage can be higher for the solar PV system used in topology form FIG. 3. Solar PV system power 502 is sized based on the load power 501, which is applicable to the topologies from FIGS. 2 and 3.

A control method for power blending topology shown in the FIGS. 6 and 7 is described below. Solar PV and AC grid power are the inputs to the microcontroller operated power blender controller, with single/three phase AC output load 610, on FIG. 6, or DC output load 710, on FIG. 7.

Power blender controller 600 (FIG. 6) has three distinctive power conversion devices: Power factor correction (PFC) circuit 604 that interfaces AC source power via single phase diode bridge rectifier 603, a boost circuit 607 that is connected to the solar source on the input and single or three phase variable frequency drive—VFD 609 that is connected to the single or three phase motor load 610. The operation of all three circuits is controlled by microcontroller's 615 signals: PFC circuit is controlled by Vref 616, boost circuit is controlled by duty 611, VFD is controlled by signal d 614, which are all a result of the power blending control algorithm, based on feedback signals: Vpv 613, Iind 612, and Vblend 608.

Power Blending Controller 600 operates a load 610 by using Solar PV source 605 energy to offset energy from AC source 601. Operating principles of Power Blending Controller (Blender) are described by the flowchart shown in FIG. 11 and associated text above.

A microcontroller that operates Power Blender Controller
   firstly reads the input signals: Vblend, Vpv and Iboost in order to generate a signal d for controlling the boost circuit using the control method from FIG. 9, and
At the same time microcontroller provides Vref voltage value to the PFC circuit that starts regulating Vblend at Vref value, if AC power source is available
At the same time VFD circuit starts applying the voltage output to the motor load per method described in the FIG. 10, in order to start motor's operation
If the AC power source is present, PFC circuit will continue regulating Vblend at Vref voltage level, while motor speed will increase as a result of VFD control method described by FIG. 10. Motor frequency and voltage, and thus motor rotational speed, will reach maximum if AC power source is available. PFC circuit regulates a Vblend voltage 608 at Vref voltage level 304, from FIG. 3. Vref level is different for different motor types (example: for 120 Vac phase voltage motors, Vref can be 190 Vdc, while for 240 Vac motor types Vref can be 370 Vdc).
As soon as Vblend voltage is regulated at Vref, a VFD circuit 609 starts increasing output frequency and voltage, which starts a rotation of single or three phase motor load 610. Once the microcontroller senses or detects that the VFD output has started rotation of the motor, the VFD tries to regulate Vblend 307 voltage at Vref−X voltage value, from FIG. 3, which is lower than Vref value that PFC circuit is regulating the Vblend voltage at. Because PFC circuit has infinite source of AC power (utility grid), it will maintain regulating Vblend voltage at Vref, which is higher than Vref−X level the VFD controller is trying to regulate at.
VFD controller from FIG. 10 as a result of trying to regulate Vblend at Vref−X increases the output motor frequency—f* 1005, until it reaches maximum frequency.
If however AC power is not available, then PFC circuit is off, and Vblend voltage is regulated by VFD at Vref−X voltage level (X can be any suitable number, for example if X=10, and Vref=370V, then Vref−X=360V).
A duty signal 913, from FIG. 9 for boost circuit 607 is actually obtained from PI boost current controller 912. A difference between measured inductor current—Iind 911 of the boost circuit and reference I*boost current 910 is an input to the Boost current controller 912. I*boost reference current value 910 is obtained from MIN block 909 whose inputs are current references: I* 905—a result of PV voltage PI controller block 904 and I** 914—a result of DC link voltage PI controller block 908. PV voltage controller block performs maximum power point tracking (MPPT) algorithm of solar PV input panels, and if I* is of a smaller value than I, then boost circuit 607 will perform MPPT operation. If however, I is of a smaller value than I*, then boost circuit 607 will perform DC link voltage regulation of DC link—Vblend voltage level at a reference voltage of Vref+X, per FIG. 8.

In MIN block, a minimum result of the two control loops 904 and 908 takes control, while the other loop gets knocked out. Because DC link voltage controller 908 output I** 914 is resulting in higher value than PV voltage controller 904 output I* 905 boost circuit will perform MPPT operation over solar PV input, while PFC circuit will continue regulating the Vblend voltage. As a result, boost circuit will extract maximum amount of power from input solar PV system, while AC source would be providing remaining amount of power to 100% motor load power, while regulating the Vblend voltage.

If DC link voltage controller 908 overtake PV voltage controller 904, which would happen if all power for the motor load is provided by Solar PV source only, per DC link voltage controller loop 908, the solar PV source will NOT perform MPPT operation anymore and, Boost circuit will regulate DC link voltage Vblend at voltage level of Vref+X, and motor will be operating at the maximum operating frequency.

If the motor load is not entirely provided by solar PV source, but AC source is still providing portion of load power, then PFC circuit will regulate Vblend voltage, while boost circuit performs MPPT operation Ultimately, the VFD voltage control loop (FIG. 5) will adjust the motor frequency to match solar input PV power with motor output power. Hence, MPPT operation is still performed by boost circuit, while VFD is regulating DC link voltage Vblend at V*PFC-X.

Figure 12:
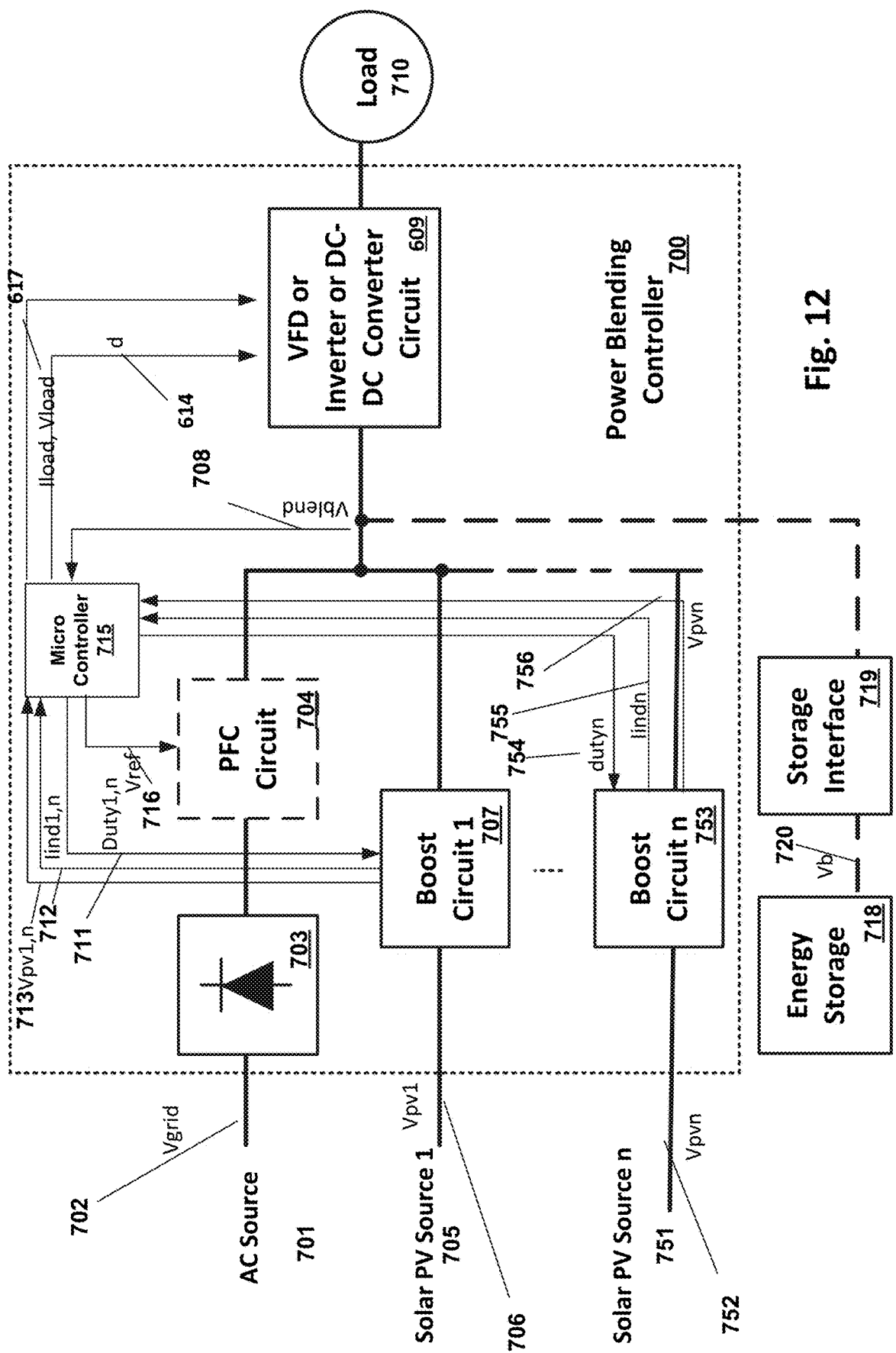
FIG. 12 is a diagram of an embodiment of a system incorporating a Power Blending Controller (PBC) 700 with a built in VFD circuit (609), when supplying power to a given motor load 710.

FIG. 12 depicts an embodiment of a system incorporating a Power Blending Controller (PBC) 700 with a built in VFD circuit (609), when supplying power to a given motor load 710.

Single or multi-phase AC Source 701 with its input voltage of Vgrid 702 is one input to the Power Blending Controller 700. Vgrid is an input to the rectifier 703 and rectified voltage feeds Power Factor Correction (PFC) circuit 704, which regulates voltage of a Vblend 708, at a predefined value. A few embodiments lack PFC circuit 704, in which case output of the rectifier 703 is a non-regulated voltage of a Vblend 708.

Figure 14A:
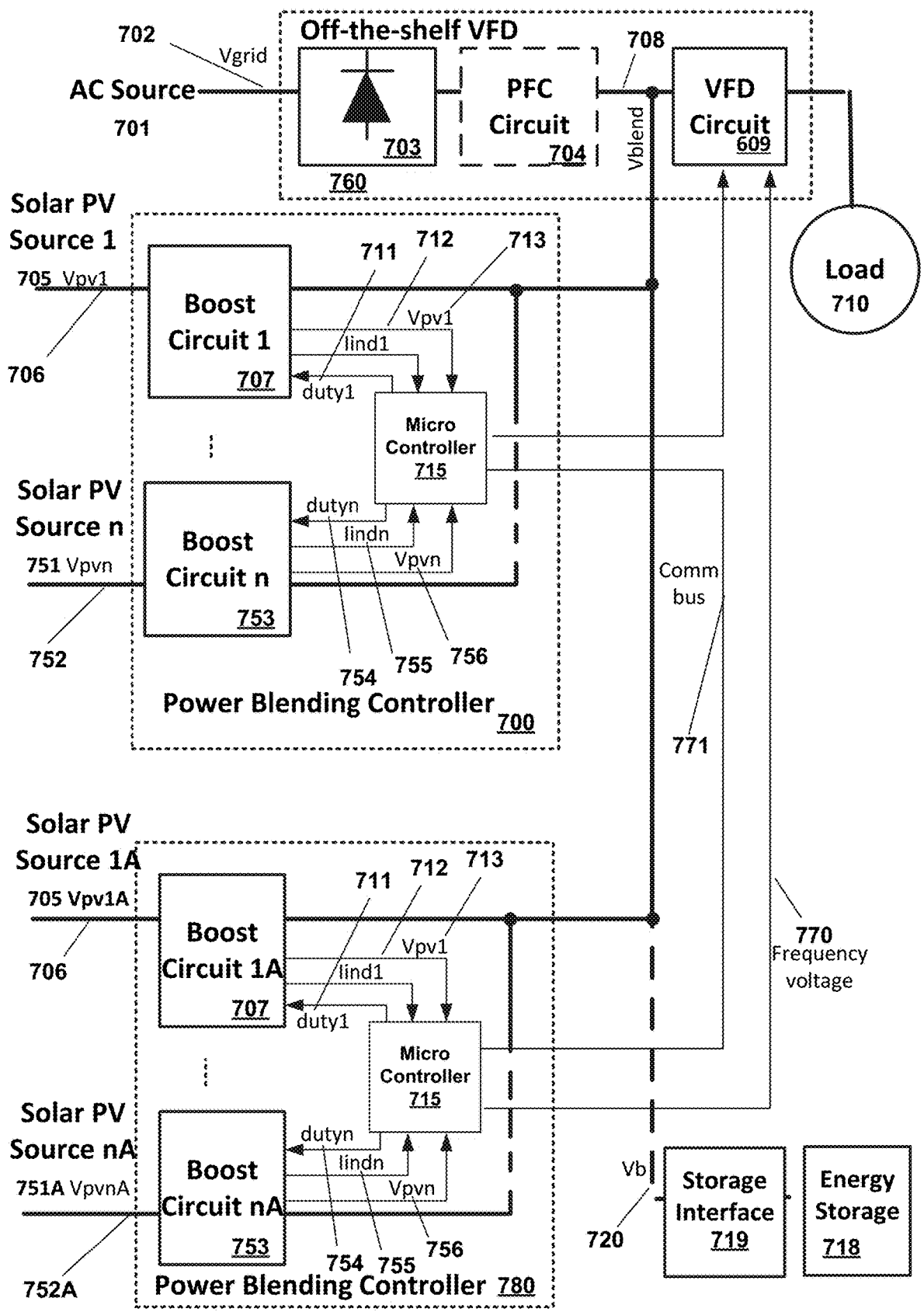
FIG. 14A is a diagram of multiple parallel-connected Power Blending Controllers (700, 780) providing a DC power to the DC port of an off-the shelf VFD (760).
Figure 14B:
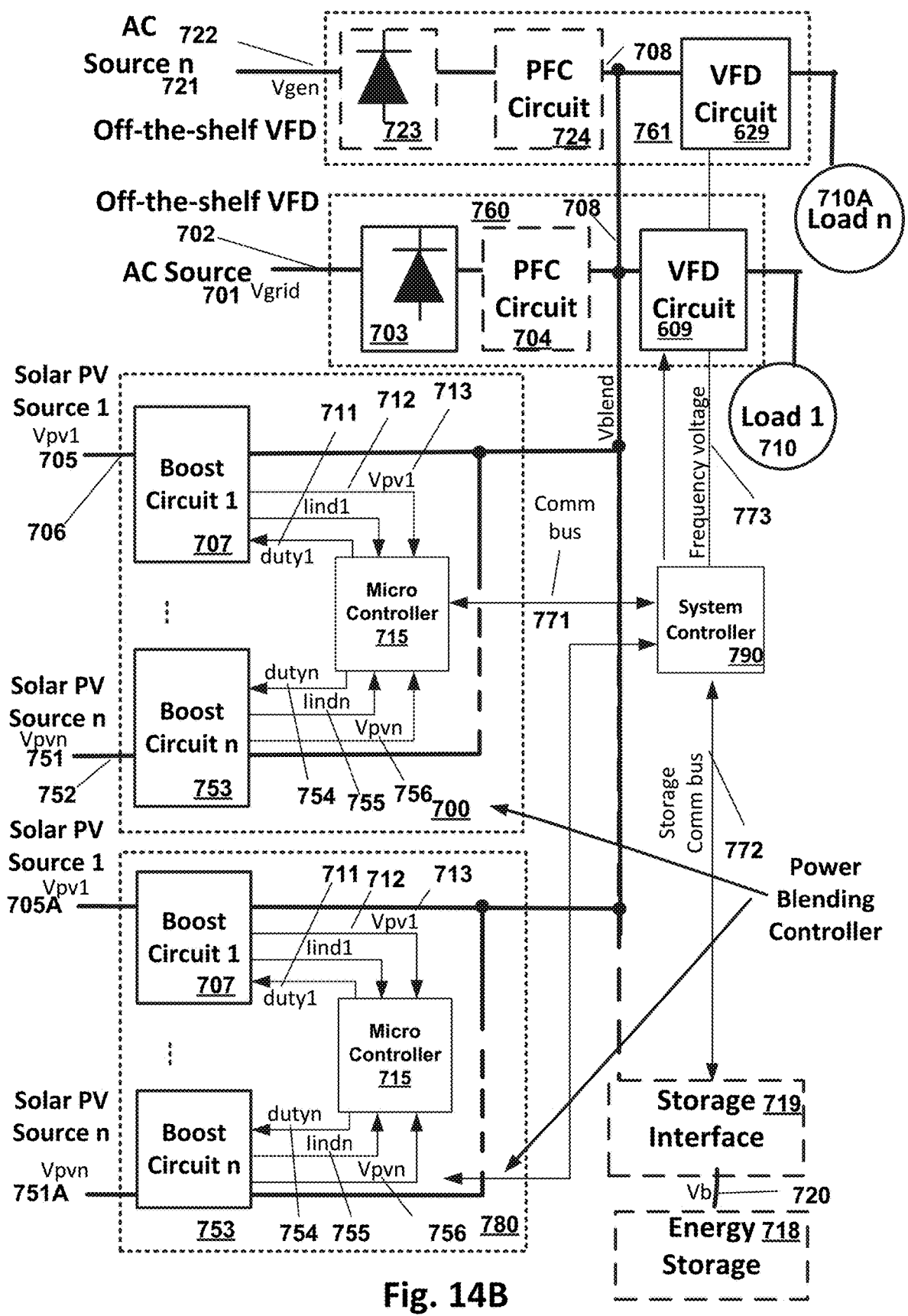
FIG. 14B depicts an embodiment resembling that of FIG. 14A with multiple connected Power Blending Controllers (700, 780) providing a DC power to the DC port of multiple off-the shelf VFDs (760, 761) supplying different loads (710, 710A) connected to the same Vblend node (708).

In an embodiment, as illustrated in FIG. 14B, there may be more than one AC source, such as AC source n 721. For example, AC source 701 may be tied to a utility grid power and AC source n 721 may be coupled to an on-premises generator providing an AC voltage 722. This configuration is of use in cogeneration applications or where the on-premises generator is a backup power generator that is started upon failure of the utility grid power of AC source 701. In these embodiments, AC source n 721 couples through an additional rectifier 723 and a power factor correction circuit that may include a DC-DC converter 724 to Vblend 708. When AC source 701 is inoperative, AC source n 721 operates to serve all functions described herein with reference to AC source 701.

At the same time two or more solar PV sources 705, 751 with its voltage Vpv1 to Vpvn 706, 752 presents an input to two or more parallel DC-DC converters or boost circuits 707, 753, including power switches, in most embodiments MOSFETs controlled to boost the voltage, from Vpv1/Vpvn 705, 752 voltage to a Vblend voltage 708, which is an input voltage for Variable Frequency Drive (VFD) 609 that drives a single or multiphase AC load 710. Signals 755 and 756 indicating Ipvn (current from solar PV source 751) and Vpvn are provided to the microcontroller to permit MPPT tracking as are signals 712, 713 indicating Ipv1 (current from solar PV source 705) and Vpv1. This configuration is used when power is combined from more than panel or more than one string of solar panels, particularly if a first string has different characteristics or is exposed to more shade than a second string; this configuration allows each string of one or more panels to be operated at an MPP for that particular string of panels. For example, if a first string has 4 panels from one manufacturer (coupled to Vpv1) and a second string (coupled to Vpvn) has 5 panels from another manufacturer, the maximum power point voltages are likely to be quite different between the first and second string, yet both strings can operate at maximum power points with power combined at Vblend 708.

A Microcontroller 715 is an integral part of the Power Blending Controller 700 and has feedback and control signals to and from: PFC circuit 704 (if present), two or more boost circuit 707, 753 and VFD circuit 609, as well as Vblend 608 parameters. Feedback signals that input to microcontroller 715 provide information about current solar PV parameters: solar panel current (Ipv) and solar panel voltage (Vpv) 713, Boost inductor current (Iind) 712, and load current (Iload) and load voltage (Vload) and load frequency (fload) parameters. There are control signals from microcontroller 615, that control power switches (MOSFETS and IGBTs) that carry out power conversion between AC 701 and two or more parallel solar input sources 705, 751 on one side, and AC load 710 on the other. A microcontroller signal that controls boost circuit 707 is duty cycle 711, or with multiple boost circuits also duty cycle n 754, while microcontroller can provide a reference voltage (Vref) that controls PFC circuit 716, defining a voltage level at which PFC circuit regulates the DC link voltage: Vblend 708, if PFC circuit is present. If PFC circuit is not present however, then Vblend voltage 708 is not regulated, but is a result of rectified AC source 701 voltage.

Lastly, microcontroller uses signal d for controlling operation of VFD circuit 609, depending on the AC load 710 Power Blending Controller is attached to.

In some embodiments, the system may have an optional energy storage 718 with a storage interface 719 that is connected to the Vblend 708 DC voltage port. The interface 719 can charge the energy storage 718 by drawing power from the Vblend 708 DC port or can discharge the energy storage 718 by supplying power to the Vblend 708 DC port according to motor demand, AC power pricing, storage 718 charge level, and solar power availability. In some embodiments, storage interface 719 includes a bidirectional DC-DC converter operable to convert power at a Vblend 708 voltage to and from a battery voltage Vb 720. In an embodiment, storage interface 719 charges energy storage 718 with more solar power is available than being consumed by the VFD 609, and discharges energy storage 718 to help meet startup surge requirements of load 710 or to operate load 710 when load 710 has a high priority and insufficient solar power is available to run load 710; energy storage 718 thereby helps to reduce need for drawing power from AC source 701.

1. If AC source power 701 is available then Vblend 708 voltage is either regulated by PFC circuit 704, or if PFC is not part of the system then Vblend is a result of rectified AC source 701 voltage. In this scenario if available power from solar PV sources 705, 751 is less than AC load 710 power, then two or more boost circuits 707, 753 are generating maximum possible power from two or more solar sources 706, 752 by using maximum power point strategies. If AC source 701 is available the storage interface 719 can either charge or discharge the energy storage 718, depending of the state of charge of the energy storage 718.
2. If AC source power 701 is available then Vblend 708 voltage is either regulated by PFC circuit 704, or if PFC is not part of the system then Vblend 708 is a result of rectified AC source 701 voltage and available solar power is more than AC load 710 power, then one or more boost circuits 707, 753 are generating maximum possible power from two or more solar sources 706, 752 by using maximum power point (MPPT) strategy. Under this scenario if system has Energy Storage 718, all the boost converters 707/753 operate in MPPT mode, extracting maximum power from solar PV sources 705/751 until the Energy Storage 718 state of charge is 100%.
3. If AC source power 701 is not available, and the energy storage 718 is present in the system, and state of charge of the energy storage 718 is higher than 0, then the storage interface 719 regulates Vblend 708 voltage at a predefined value, while two or more boost circuits 707, 753 are generating maximum possible power from two or more solar sources 706, 752 by using maximum power point strategy.
4. If AC source power 701 is not available, and the energy storage 718 is not present in the system, then one or more boost circuits that can supply highest level of power (which is at least power of AC load divided by number of boost circuits) are regulating a Vblend 708 voltage at a predefined value, while remaining boost circuits are generating maximum possible power from solar input sources by using maximum power point strategy, with that generated solar power being less than power provided by those boost circuits that regulate Vblend 708 voltage.
5. If AC source power 701 is not available, and the energy storage 718 is not present in the system, then two or more boost circuits supply equal solar power (which is AC load power divided by number of boost circuits) and all are regulating a Vblend 708 voltage at a predefined value.
6. If AC source power 701 is not available, and the energy storage 718 is not present in the system, and available power from solar PV sources 705/751 is less than AC load 710 power, then two or more boost circuits 707, 753 are generating maximum possible power from two or more solar sources 706, 752 by using maximum power point strategy while VFD circuit 609 is regulating the Vblend 708 voltage at a predefined value.

Figure 13A:
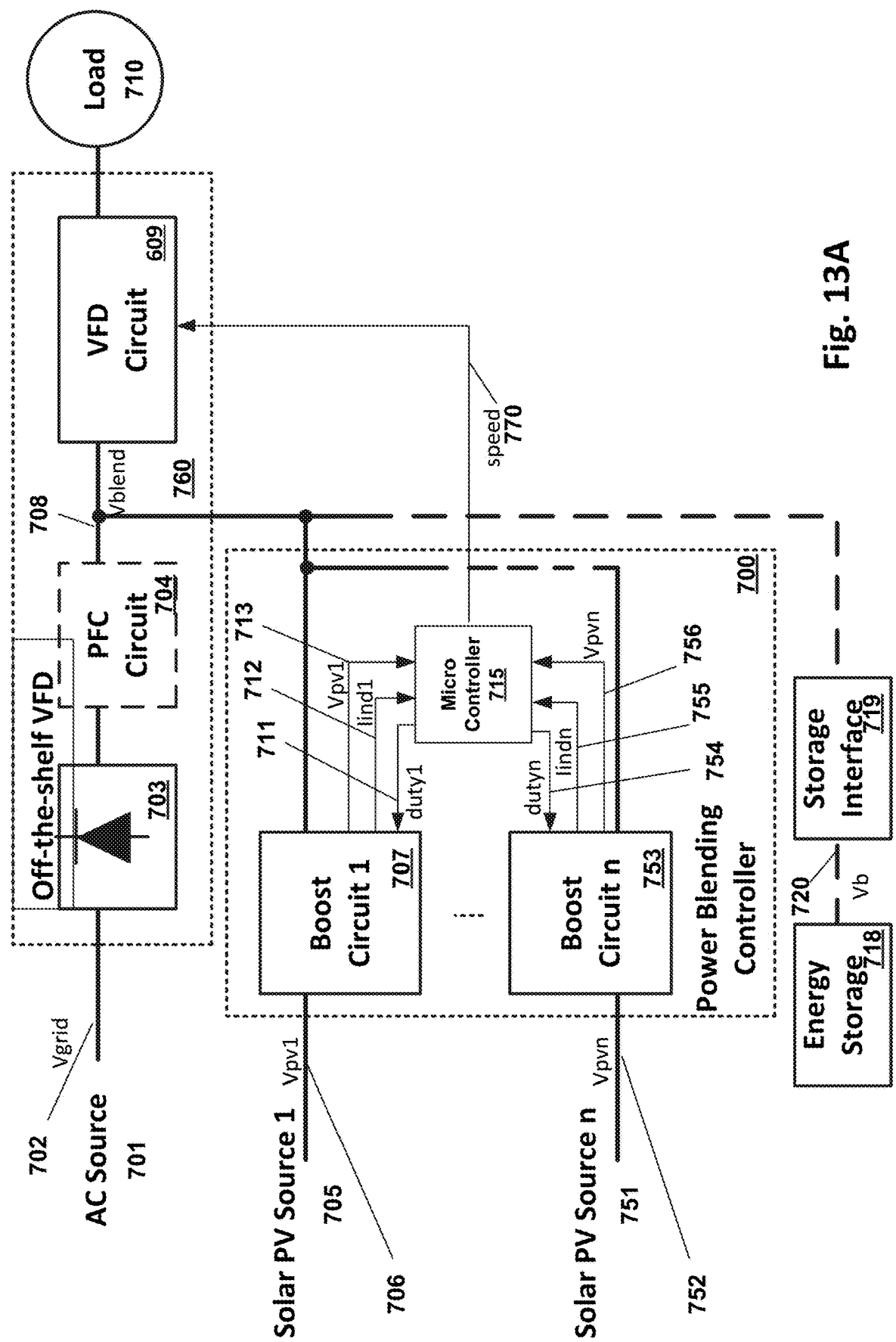
FIG. 13A is a diagram of an embodiment of the controller from FIG. 12 incorporating an off-the shelf VFD (760).

FIG. 13A is a diagram of an embodiment of the controller resembling that of FIG. 12 with an off-the shelf VFD (760). In this embodiment, the VFD includes rectifier 703 with an AC source 701 as an input, where then rectified output voltage feeds Power Factor Correction (PFC) circuit 704, which regulates voltage of a Vblend 708, at a predefined value. It is possible not to have PFC circuit at all, in which case output of the rectifier 703 is a non-regulated voltage of a Vblend 708.

The operation of boost circuits 707, 753 is the same as described in the previous FIG. 12, with an additional signal 770 controlling speed and frequency that microcontroller 715 uses to control the speed of VFD circuit 609; in embodiments having multiple VFDs such as a second VFD 629 and multiple loads, the microcontroller also provides frequency (speed) and voltage control signals to the additional VFDs like second VFD 629. This signal can be analog or digital, depending on off-the shelf VFD circuit's 609 capability.

The microcontroller 715 sets the speed of the VFD 760 using signal 770:
1. to balance the power from the two or more combined solar sources 705, 751 and the power of AC load 710. Thus, the AC load power always matches the power from the two or more combined solar sources 705, 751. The energy storage 718 is not available.
2. to adjust the total AC load 710 power draw in a real time in respect to the state of charge of energy storage 718, whereby increasing the speed (determined by the frequency and voltage applied by the VFD to the AC load 710) the AC load 710 power increases and decreasing the speed, the load AC 710 power decreases. Thus, the speed and power draw of the AC load 710 directly corresponds to the state of charge of the energy storage 718. At the same time two or more combined solar sources 705, 751, through boost circuits 707/753 using MPPT strategy, are charging the energy storage 718 through the storage interface 719, and consequently contributing to the increase in state of charge of the energy storage 718. The AC source 701 is not available.

Figure 13B:
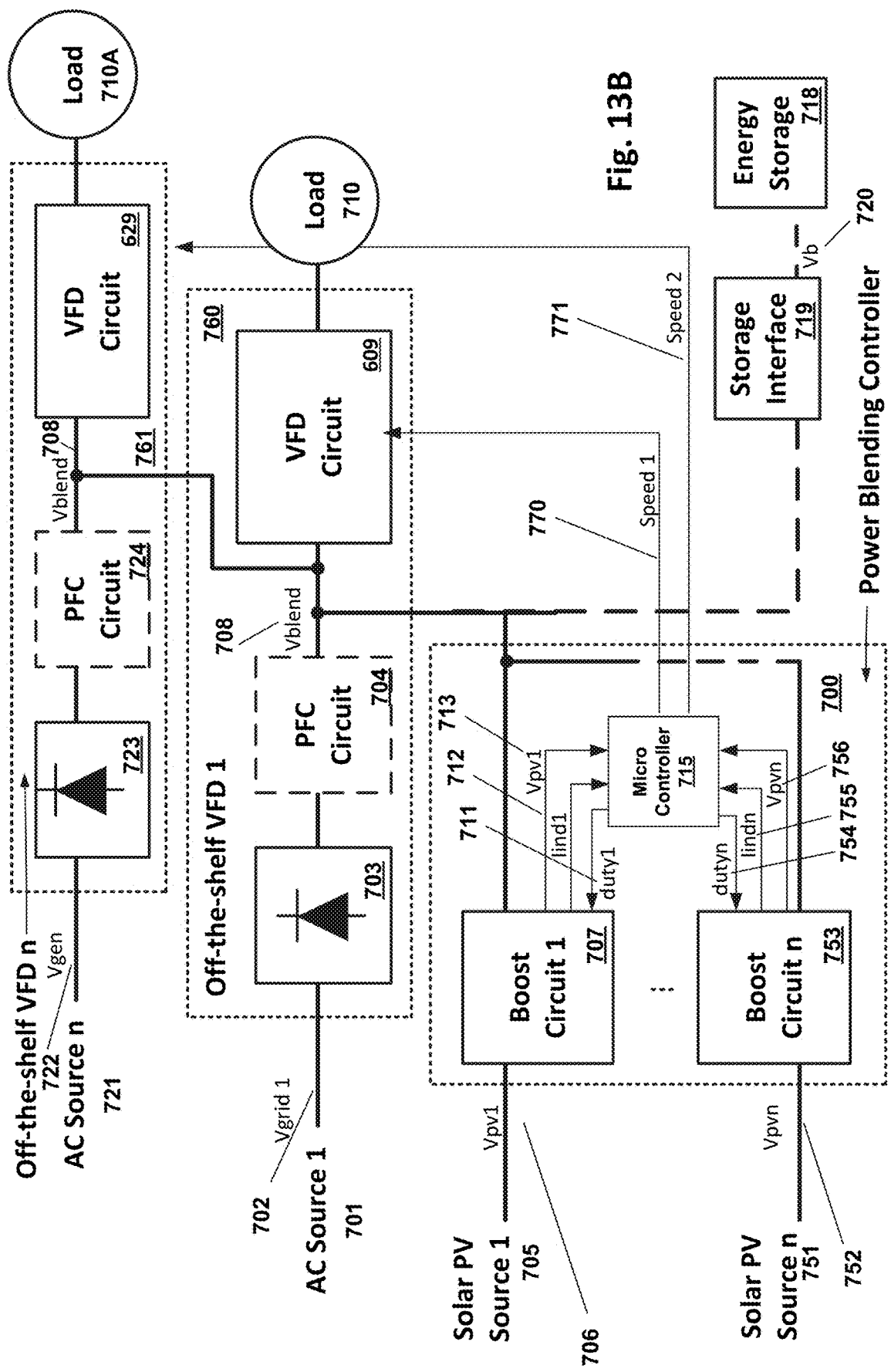
FIG. 13B resembles the embodiment from FIG. 13A but with multiple off-the shelf VFDs (761) supplying different loads (710A) all powered through the same Vblend node (708).

FIG. 13B illustrates an embodiment resembling the controller from FIG. 13A with multiple off-the shelf VFDs (760, 761), connected to the same common Vblend 708 node where Power Blending controller 700 is supplying DC power from conditioned Solar PV sources 705, 752. In this embodiment the Power Blending controller 700 controllings the speed of two or more loads (710, 710A) through the off-the shelf VFDs (760, 761), thus balancing available solar PV source (701, 751) power with load (710, 710A) power at all times.

Figure 15:
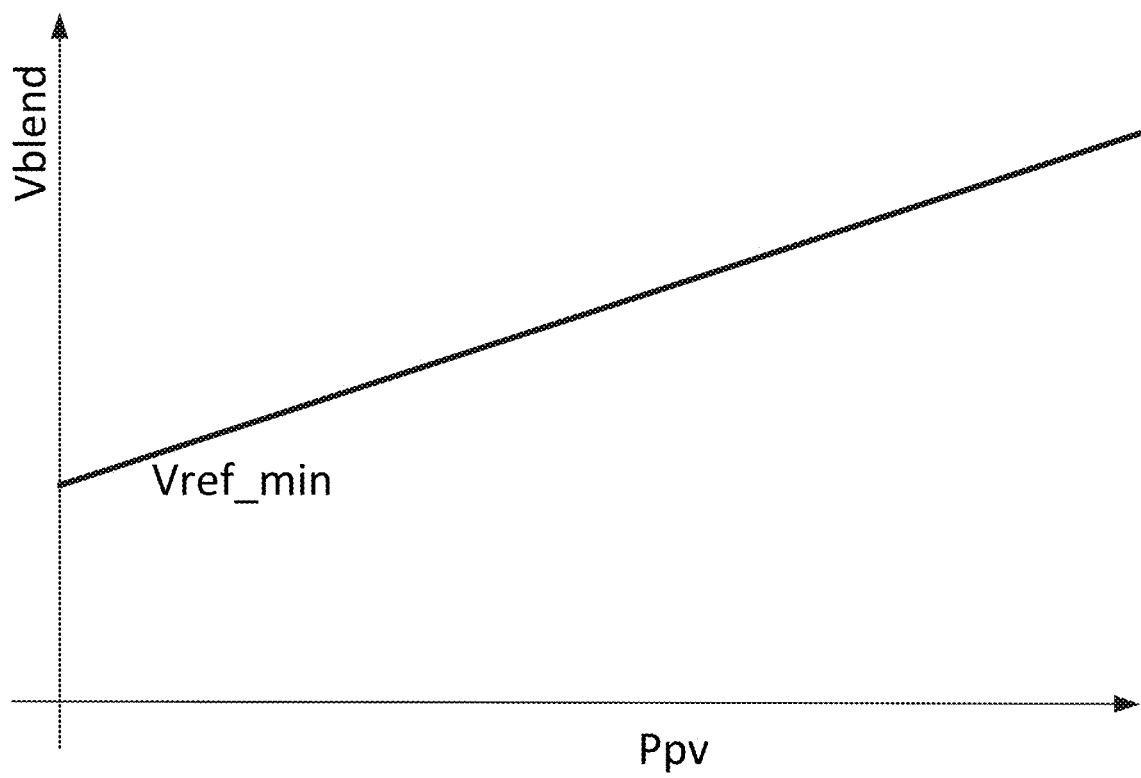
FIG. 15 depicts a predefined blending node voltage (Vblend) achieved by adjusting reference voltage (Vref) vs solar power (Ppv) curve used when sharing power between two or more Power Blending controllers.

FIG. 14A is a detailed diagram of multiple connected Power Blending Controllers (700, 780) providing a DC power to a common blending node coupled to the DC port of the off-the shelf VFD (760).
1. Power Blending Controllers from 700, 780 and VFD Circuit 760 can exchange their power information via a communication bus 771, where one Power Blending controller is doing a power balancing by collecting solar PV power availability from remaining Power Blending controllers, as well as their individual demand to increase or decrease the speed of the VFD circuit 609. VFD circuit 609 has an ability to measure AC load 710 power in a real time and provides that information to the Power Blending controller that is in charge of power balancing. If the total available power from combined solar PV sources 705, 705A, 751, 751A is higher than AC load 710 power, then it sends command commands 770 to VFD circuit 609 to increase the frequency and voltage, while if the total available power from combined solar PV sources 705, 705A, 751, 751A is lower than AC load 710 power, then it sends command to VFD circuit 609 to decrease the current speed and voltage of the VFD.
2. Two or more power blending controllers 700, 780 are providing power from combined solar PV sources 705, 705A, 751, 751A through boost circuits 707, 753, such that power is shared between the two or more Power Blending controllers 700, 780 are done by a predefined Vref vs Ppv (FIG. 15). Based on this graph, the power blending controller that generates the most power will regulate the Vblend 708 and rest of the controllers will operate in MPPT mode. In a case the total available power from all solar PV sources 705, 752 for all of Power Blending controllers 700, 780 is more than AC load 710 power, then all the power blending controllers 700, 780 provide the same equal amount of power to the AC load 710.

3. Two or more power blending controllers 700, 780 are providing power from combined solar PV sources 705, 751, through boost circuits 707, 753, such that power is shared between two or more Power Blending controllers 700, 780 at a predefined Vref vs Ppv (FIG. 15) such that if total amount of combined power from solar PV sources 705, 705A, 751, 751A is less than AC load 710 power, where remaining power is provided by AC source 701, then two or more power blending controllers 700, 780 are performing MPPT strategy through boost circuits 707, 753.

4. Two or more power blending controllers 700, 780 are providing power from combined solar PV sources 705, 751, through boost circuits 707, 753, such that power is shared between two or more Power Blending controllers 700, 780 at a predefined Vref vs Ppv (FIG. 15) such that if total amount of combined power from solar PV sources 705, 751 is bigger than AC load 710 power, then two or more solar blending controllers regulate the Vblend 708 by equally sharing the AC load 710 power.

FIG. 14B is a detailed diagram of an embodiment of the multiple Power Blending controllers (700, 780) from FIG. 14A, but also with a multiple off-the shelf VFDs (760, 761), connected to the same common Vblend 708 node, where Power Blending controllers (700, 780) are supplying DC power from conditioned Solar PV sources 705, 752. In this embodiment there is an additional System level controller (790) that communicates with multiple Power Blender controllers (700, 780), multiple off-the shelf VFDs (760, 761) and storage interface (719), such that:

The system level controller measures available solar PV source (705, 751) power, measures required load (710, 710A) power and storage (718) state of charge, and based on that information sets speed commands (773) for each of the multiple off-the shelf VFDs (760, 761) to make a decision of which component regulates Vblend (708), in order to balance the total power between all components of the system. And The power balance is maintained the same way as explained above on page 6, through 4 steps, with additional multiple VFDs (761) in the system, and having one system level controller (790) making a decision, instead of one of the Power Blender controllers.

Combinations of Features

The features herein described can be collected in any combination, as necessary to meet a variety of applications. In particular the inventors anticipate the following particular combinations.

An energy blending device designated A has a first input configured for alternating current, a second input configured for connection to series-connected solar panels, and an output, the energy blending device including a rectifier receiving the first input, and having the rectifier output coupled to power an energy blending node; and a plurality of series-connected solar photovoltaic panels coupled to power the energy blending node. The device is selected from the group consisting of the series-connected solar panels matching a voltage of and coupled to the energy blending node, the blending node providing power through a DC-DC converter to a load interface device, and the series-connected solar panels coupled through a DC-DC converter to the energy blending node, the energy blending node providing power to a load interface device. The energy blending device further includes a microcontroller being coupled to control the DC-DC converter and load interface device; and an energy storage system such as a battery coupled directly to the energy blending node or a battery coupled through an energy storage interface to the energy blending node.

An energy blending device designated AA including the energy blending device designated A where the series-connected solar panels couple through a DC-DC converter to the energy blending node, the energy blending node providing power to a load interface device, and the battery is coupled through an energy storage interface having DC-DC conversion capability to the energy blending node; and the energy storage interface is configured to operate under control of the microcontroller in modes including charging the battery from the energy blending node and drawing energy from the battery to provide energy to the energy blending node.

An energy blending device designated AB including the energy blending device designated A where the series-connected solar panels couple directly to the energy blending node and the load interface device is coupled to the energy blending node through a DC-DC converter.

An energy blending device designated AC including the energy blending device designated A, AA, or AB wherein the load interface device is selected from the group consisting of a variable frequency motor drive, a DC-DC converter, and a DC-AC inverter.

An energy blending device designated AD including the energy blending device designated A, AA, AB, or AC where the rectifier DC output is coupled to power an energy blending node through a second DC-DC converter configured to reduce power factor.

An energy blending device designated AE including the energy blending device designated A, AA, AB, AC, or AD wherein the load interface device is a variable frequency motor drive.

An energy blending device designated AF including the energy blending device designated A, AA, AB, AC, AD, or AE where the microcontroller is configured to start a generator if solar power is insufficient to start a motor coupled to the load interface device.

An energy blending device designated AG including the energy blending device designated A, AA, AB, AC, AD, AE, or AF the microcontroller is configured to start a generator if solar power is insufficient to start a motor coupled to the load interface device.

A method designated B of combining energy from solar panels, an AC source, and an energy storage device to operate includes passing energy from each of the AC source and the solar panels to an energy blending node, and passing energy in a direction selected from the group consisting of from the energy storage device to the energy blending node and from the energy blending node to the energy storage device, the direction selected according to available energy at the energy blending node and energy needs of a load. The method also includes passing energy from the energy blending load through a load interface device to the load.

A method designated BA including the method designated B wherein the step of passing energy from the energy blending node through the load interface device comprises passing energy through a DC-DC voltage converter.

A method designated BB including the method designated B or BA wherein the step of passing energy in a direction selected from the group consisting of from the energy storage device to the energy blending node and from the energy blending node to the energy storage device involves passing energy through a DC-DC voltage converter.

A method designated BC including the method designated B, BA, or BB wherein the step of passing energy from the AC source to the energy blending node comprises passing energy through a power factor correction unit comprising a DC-DC converter.

A method designated BD including the method designated B, BA, BB, or BC wherein the step of passing energy from the solar panels to the energy blending node comprises passing the energy through a DC-DC voltage converter.

A method designated BE including the method designated B, BA, BB, BC, or BD further including monitoring a voltage of the energy blending node and controlling at least one DC-DC voltage converter to maintain the voltage of the energy blending node within limits A method designated BF including the method designated B, BA, BB, BC, BD, or BE wherein the load interface device includes a variable frequency motor drive.

An energy blending device designated C has a first input configured for alternating current, a second input configured for connection to a solar panel, and an output, the energy blending device includes a rectifier receiving the first input, the rectifier coupled through a first DC-DC converter configured for power factor correction and having a DC output coupled to an energy blending node, the voltage of the energy blending node being regulated at a pre-set value by the first DC-DC converter to match a maximum power voltage of the solar PV panels. The energy blending device also includes an output driving circuit coupled to receive power from the energy blending node through a second DC-DC converter, the output driving circuit selected from the group consisting of a variable-frequency motor driver, a third DC-DC converter, and an inverter; and a microcontroller coupled to control the first and second DC-DC converters. The second DC-DC converter regulates an input voltage for the output driving circuit.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. An energy blending device having a first input configured for receiving alternating current (AC), a second input configured for connection to solar panels, and a first AC output, the energy blending device comprising:
   a rectifier receiving the first input, and coupled to power an energy blending node;
   the second input coupled to power the energy blending node through a first boost circuit,
   the energy blending node coupled to power a first variable frequency motor drive (VFD) coupled to drive the first AC output; and
   a microcontroller coupled to control the first boost circuit and first VFD; and
   wherein the microcontroller is configured to receive inputs from sensors adapted to measure voltage, current, and frequency provided by the first VFD, the microcontroller being configured to control voltage of the energy blending node, the microcontroller configured to operate the first boost circuit to track a maximum power point (MPP) of any photovoltaic power source coupled to the second input, and the microcontroller is configured to start the first VFD at reduced frequency and voltage, and to then increase frequency and voltage of the first VFD to match power coupled through the first VFD to available power.

2. The energy blending device of claim 1 further comprising:
   a third input coupled to power the energy blending node through a second boost circuit;
   the microcontroller being configured to operate the second boost circuit to track a maximum power point (MPP) of any photovoltaic power source that may be coupled to the second input.

3. The energy blending device of claim 2 wherein an output of the rectifier is coupled to the energy blending node through a power factor correction circuit (PFC) comprising a boost DC-DC converter circuit, controlled by the microcontroller.

4. The energy blending device of claim 3 further comprising a second VFD coupled to drive a second AC output, wherein the microcontroller is further configured to prioritize operation of the first and second VFDs, and to start the second VFD at reduced frequency and voltage, and to then increase frequency and voltage of the second VFD to a limit determined from available power and priority of operation of the second VFD.

5. The energy blending device of claim 4 further comprising:
   an energy storage interface adapted to transfer power between the energy blending node and an energy storage device.

6. The energy blending device of claim 3 further comprising:
   an energy storage interface adapted to transfer power between the energy blending node and an energy storage device.

7. The energy blending device of claim 1 further comprising:
   an energy storage interface adapted to transfer power between the energy blending node and an energy storage device.

8. The energy blending device of claim 4 wherein an output of the rectifier is coupled to the energy blending node through a power factor correction circuit (PFC) comprising a DC-DC converter circuit, controlled by the microcontroller.

9. A method of combining energy from at least a first solar photovoltaic source and an AC source to operate a first AC electric motor comprising:
   passing energy from the first solar photovoltaic source through a first boost circuit to an energy blending node;
   passing energy from the AC source through a rectifier and a power-factor correction (PFC) circuit converter to the energy blending node;
   passing energy from the energy blending node through a variable frequency motor drive (VFD) to the first AC electric motor at a first frequency and voltage;
   detecting start of the first AC electric motor; and
   upon start of the first AC electric motor, passing energy from the energy blending node through the VFD to the first AC electric motor at a second frequency and voltage, the second frequency and voltage being greater than the first frequency and voltage and dependent on power available from the first solar photovoltaic source.

10. The method of claim 9 where the second frequency and voltage is selected to minimize power drawn from the AC source.

11. The method of claim 10 further comprising passing energy from second solar panels through a second boost circuit to the energy blending node.

12. The method of claim 11 further comprising passing energy through an energy storage interface between the energy blending node and an energy storage device.

13. The method of claim 10 further comprising:
prioritizing operation of the first AC electric motor and a second AC electric motor to determine if the second AC electric motor should operate;
on determining the second AC electric motor should operate, passing energy from the energy blending node through a variable frequency motor drive (VFD) to the second AC electric motor at a first frequency and voltage;
detecting start of the second AC electric motor; and
upon start of the second AC electric motor, passing energy from the energy blending node through the VFD to the second AC electric motor at a second frequency and voltage, the second frequency and voltage being greater than the first frequency and voltage and dependent on power available from the first solar photovoltaic source and power used by the first AC electric motor.

14. The method of claim 13 further comprising passing energy from second solar photovoltaic source through a second boost circuit to the energy blending node.

15. The method of claim 13 further comprising passing energy through an energy storage interface between the energy blending node and an energy storage device.

16. The method of claim 15 further comprising passing energy from second solar photovoltaic source through a second boost circuit to the energy blending node.

17. An energy blending device having a first input configured for single phase alternating current (AC), a second input configured for connection to a solar photovoltaic source, and an AC motor output, the energy blending device comprising:
a rectifier coupled to receive the first input;
a first DC-DC converter coupled to receive an output of the rectifier, and to power an energy blending node, the first DC-DC converter adapted to be controlled by a microcontroller to perform power factor correction for the first input and to regulate voltage at the energy blending node;
a second DC-DC converter coupled to receive the second input and coupled to power the energy blending node, the second DC-DC converter adapted to be controlled by the microcontroller to perform maximum power point tracking of the solar photovoltaic source and adapted to regulate voltage of the energy blending node; and
the energy blending node being coupled to power a Variable Frequency Drive (VFD) configured to drive through the AC motor output a single or three phase AC motor, where the VFD is configured to provide a frequency and voltage to the AC motor output controllable by the microcontroller.

18. The energy blending device of claim 17 wherein the microcontroller is configured to start the VFD at reduced frequency and voltage, and to then increase frequency and voltage provided by the VFD to at the AC output until power to the VFD matches available power from the second input.

19. The energy blending device of claim 18 further comprising a third input coupled to power the energy blending node from a second solar photovoltaic source through a third DC-DC converter.

20. A group of energy blending devices, each energy blending device comprising:
a first input configured for connection to a first solar photovoltaic source,
a second input configured for connection to a second power source, and
a first DC-DC converter adapted to be controlled by a microcontroller to perform maximum power point tracking of the first solar photovoltaic source and adapted to couple power onto, and regulate voltage, of a blending node, and
a second DC-DC converter adapted to be controlled by the microcontroller to couple power from the second power source onto the blending node;
each of the energy blending devices having their first input connected to a different solar photovoltaic source, and with their energy blending node connected together to provide power to a variable frequency drive configured to drive a single or three phase AC motor;
where there is a communication between microcontrollers of each energy blending device of the group of energy blending devices to communicate available solar power on each individual blending device; and
where variable frequency drive frequency is controlled by one or more microcontrollers of the energy blending devices based on communicated available solar power.

21. A first and a second energy blending device coupled to a common energy blending node, each energy blending device comprising:
a first input configured for connection to a first solar photovoltaic source,
a second input configured for connection to a second power source, and
a first DC-DC converter adapted to be controlled by a microcontroller to perform maximum power point tracking of the first solar photovoltaic source and adapted to couple power onto, and regulate voltage, of the common energy blending node, and
a second DC-DC converter adapted to be controlled by the microcontroller to couple power from the second power source onto the energy blending node;
where the microcontroller of the first energy blending device is coupled to communicate with the microcontroller of the second energy blending device;
the common energy blending node is coupled to power a Variable Frequency Drive (VFD) configured to receive power from the blending node and to drive a single or three phase AC motor; and
where the first and second energy blending devices communicate to determine the energy blending device of the first and second energy blending devices with the highest solar power available and to configure the energy blending device with the highest solar power available to regulate voltage of the common blending node, and
where regulated voltage for the blending node is determined from a linear voltage vs power curve, so that when the energy blending device with highest power available provides higher power to the common energy blending node the regulated voltage of the common energy blending node is greater than when the energy blending device with the highest solar power available provides lower power to the common energy blending node.

22. The first and second energy blending devices of claim 21 wherein the microcontroller of each energy blending device is configured to communicate to the microcontroller of other blending devices through a master controller.

23. The first and second energy blending devices of claim 22 wherein the master controller is further configured to receive power requirement information from at least one variable frequency drive, determine power availability from all blending devices of the first and second energy blending devices, a state of charge from zero or more energy storage interfaces, and to determine which of the first and second energy blending devices or energy storage interfaces will regulate common blending node voltage, and to determine a voltage and frequency for the at least one variable frequency drive.

* * * * *